US008650586B2

(12) United States Patent
Lee et al.

(10) Patent No.: US 8,650,586 B2
(45) Date of Patent: Feb. 11, 2014

(54) METHODS AND APPARATUS FOR USING AUDIENCE MEMBER BEHAVIOR INFORMATION TO DETERMINE COMPLIANCE WITH AUDIENCE MEASUREMENT SYSTEM USAGE REQUIREMENTS

(75) Inventors: Morris Lee, Palm Harbor, FL (US);
Paul M. Mears, Safety Harbor, FL (US);
Robert A. Luff, Wittman, MD (US);
Arun Ramaswamy, Tampa, FL (US);
Stanley F. Seagran, Cortland Manor, NY (US); Weston P. Headley, Battle Ground, WA (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 760 days.

(21) Appl. No.: 11/856,602

(22) Filed: Sep. 17, 2007

(65) Prior Publication Data
US 2008/0059988 A1 Mar. 6, 2008

Related U.S. Application Data

(63) Continuation of application No. PCT/US2006/010015, filed on Mar. 17, 2006.

(60) Provisional application No. 60/662,604, filed on Mar. 17, 2005.

(51) Int. Cl.
*H04N 7/16* (2011.01)
*H04H 60/33* (2008.01)
*H04H 60/45* (2008.01)
*H04W 24/00* (2009.01)

(52) U.S. Cl.
USPC ........ 725/9; 725/10; 725/11; 725/14; 725/20; 455/456.1; 455/456.3

(58) Field of Classification Search
USPC .................. 725/9–14, 18–19, 21–22, 20; 455/456.1, 456.3
See application file for complete search history.

(56) References Cited

U.S. PATENT DOCUMENTS

| 3,056,135 | A | 9/1962 | Currey et al. |
| 4,107,734 | A | 8/1978 | Percy et al. |

(Continued)

FOREIGN PATENT DOCUMENTS

| WO | WO 99/55057 | 10/1999 |
| WO | 03087871 | 10/2003 |

(Continued)

OTHER PUBLICATIONS

Yeung, K.L., & Yum, T.-S.P. "A Comparative Study on Location Tracking Strategies in Cellular Mobile Radio Systems," Global Telecommunications Conference, 1995. Globecom '95, IEEE, Nov. 14-26, 1995 (pp. 22-28 vol. 1).

(Continued)

*Primary Examiner* — Pankaj Kumar
*Assistant Examiner* — Alazar Tilahun
(74) *Attorney, Agent, or Firm* — Hanley, Flight and Zimmerman, LLC

(57) ABSTRACT

Example methods, apparatus, and articles of manufacture determine compliance with usage guidelines of an audience measurement system. Initially, location information associated with an audience member is obtained. It is then determined whether the audience member is in compliance with the usage guidelines based on the location information. Media monitoring information corresponding to the location information is then tagged as non-compliant if the audience member is not in compliance with the usage guidelines.

26 Claims, 16 Drawing Sheets

(56) References Cited

U.S. PATENT DOCUMENTS

| | | | |
|---|---|---|---|
| 4,626,904 A | 12/1986 | Lurie | |
| 4,644,509 A | 2/1987 | Kiewit et al. | |
| 4,695,879 A | 9/1987 | Weinblatt | |
| 4,718,106 A | 1/1988 | Weinblatt | |
| 4,769,697 A | 9/1988 | Gilley et al. | |
| 4,779,198 A | 10/1988 | Lurie | |
| 4,930,011 A | 5/1990 | Kiewit | |
| 4,955,000 A | 9/1990 | Nastrom | |
| 4,990,892 A | 2/1991 | Guest et al. | |
| 5,119,104 A | 6/1992 | Heller | |
| 5,226,177 A | 7/1993 | Nickerson | |
| 5,382,970 A | 1/1995 | Kiefl | |
| 5,457,807 A | 10/1995 | Weinblatt | |
| 5,483,276 A * | 1/1996 | Brooks et al. | 725/10 |
| 5,550,928 A | 8/1996 | Lu et al. | |
| 5,583,776 A | 12/1996 | Levi et al. | |
| 5,630,203 A | 5/1997 | Weinblatt | |
| 5,640,144 A | 6/1997 | Russo et al. | |
| 5,692,215 A | 11/1997 | Kutzik et al. | |
| 5,740,035 A | 4/1998 | Cohen et al. | |
| 5,774,876 A | 6/1998 | Woolley et al. | |
| 5,793,409 A | 8/1998 | Tetsumura | |
| 5,815,114 A | 9/1998 | Speasl et al. | |
| 5,884,278 A | 3/1999 | Powell | |
| 5,980,246 A | 11/1999 | Ramsay et al. | |
| 6,002,918 A | 12/1999 | Heiman et al. | |
| 6,054,950 A | 4/2000 | Fontana | |
| 6,098,048 A | 8/2000 | Dashefskt et al. | |
| 6,243,739 B1 | 6/2001 | Schwartz et al. | |
| 6,252,522 B1 | 6/2001 | Hampton et al. | |
| 6,359,557 B2 | 3/2002 | Bilder | |
| 6,430,498 B1 | 8/2002 | Maruyama et al. | |
| 6,433,689 B1 | 8/2002 | Hovind et al. | |
| 6,446,261 B1 | 9/2002 | Rosser | |
| 6,467,089 B1 | 10/2002 | Aust et al. | |
| 6,470,264 B2 | 10/2002 | Bide | |
| 6,493,649 B1 | 12/2002 | Jones et al. | |
| 6,497,658 B2 | 12/2002 | Roizen et al. | |
| 6,563,423 B2 | 5/2003 | Smith | |
| 6,585,521 B1 | 7/2003 | Obrador | |
| 6,647,548 B1 | 11/2003 | Lu et al. | |
| 6,697,628 B1 | 2/2004 | Green et al. | |
| 6,703,918 B1 | 3/2004 | Kita | |
| 6,731,942 B1 | 5/2004 | Nageli | |
| 6,748,317 B2 | 6/2004 | Maruyama et al. | |
| 6,766,524 B1 | 7/2004 | Matheny et al. | |
| 6,882,837 B2 | 4/2005 | Fernandez et al. | |
| 6,888,457 B2 | 5/2005 | Wilkinson et al. | |
| 6,890,285 B2 | 5/2005 | Rahman et al. | |
| 6,919,803 B2 | 7/2005 | Breed | |
| 6,940,403 B2 | 9/2005 | Kail, IV | |
| 6,967,674 B1 | 11/2005 | Lausch | |
| 7,076,441 B2 | 7/2006 | Hind et al. | |
| 7,080,061 B2 | 7/2006 | Kabala | |
| 7,099,676 B2 | 8/2006 | Law et al. | |
| 7,126,454 B2 | 10/2006 | Bulmer | |
| 7,148,803 B2 | 12/2006 | Bandy et al. | |
| 7,155,159 B1 | 12/2006 | Weinblatt et al. | |
| 7,295,108 B2 | 11/2007 | Corrado et al. | |
| 7,373,820 B1 | 5/2008 | James | |
| 7,739,705 B2 | 6/2010 | Lee et al. | |
| 8,229,469 B2 * | 7/2012 | Zhang et al. | 455/456.3 |
| 2002/0068556 A1 | 6/2002 | Brown | |
| 2002/0144259 A1 | 10/2002 | Gutta et al. | |
| 2002/0166119 A1 | 11/2002 | Cristofalo | |
| 2002/0174425 A1 | 11/2002 | Markel et al. | |
| 2002/0198762 A1 | 12/2002 | Donato | |
| 2003/0033600 A1 | 2/2003 | Cliff et al. | |
| 2003/0040272 A1 * | 2/2003 | Lelievre et al. | 455/3.06 |
| 2003/0093784 A1 | 5/2003 | Dimitrova et al. | |
| 2003/0122708 A1 | 7/2003 | Percy et al. | |
| 2003/0126593 A1 | 7/2003 | Mault | |
| 2003/0146871 A1 | 8/2003 | Karr et al. | |
| 2003/0171833 A1 * | 9/2003 | Crystal et al. | 700/94 |
| 2003/0177488 A1 | 9/2003 | Smith et al. | |
| 2003/0208754 A1 | 11/2003 | Sridhar et al. | |
| 2003/0222819 A1 | 12/2003 | Karr et al. | |
| 2003/0222820 A1 | 12/2003 | Karr et al. | |
| 2004/0025174 A1 | 2/2004 | Cerrato | |
| 2004/0027271 A1 | 2/2004 | Schuster et al. | |
| 2004/0039855 A1 | 2/2004 | Bohrer et al. | |
| 2004/0072577 A1 | 4/2004 | Myllymaki et al. | |
| 2004/0073615 A1 | 4/2004 | Darling | |
| 2004/0073915 A1 | 4/2004 | Dureau | |
| 2004/0122679 A1 | 6/2004 | Neuhauser et al. | |
| 2004/0198386 A1 | 10/2004 | Dupray | |
| 2004/0266457 A1 | 12/2004 | Dupray | |
| 2005/0006466 A1 * | 1/2005 | Overhultz et al. | 235/383 |
| 2005/0144632 A1 | 6/2005 | Mears et al. | |
| 2005/0172311 A1 | 8/2005 | Hjelt et al. | |
| 2005/0200476 A1 | 9/2005 | Forr et al. | |
| 2005/0201826 A1 | 9/2005 | Zhang et al. | |
| 2005/0203798 A1 | 9/2005 | Jensen et al. | |
| 2005/0204379 A1 | 9/2005 | Yamamori | |
| 2005/0234774 A1 | 10/2005 | Dupree | |
| 2005/0243784 A1 | 11/2005 | Fitzgerald et al. | |
| 2006/0053110 A1 | 3/2006 | McDonald et al. | |
| 2006/0075421 A1 | 4/2006 | Roberts et al. | |
| 2006/0168613 A1 | 7/2006 | Wood et al. | |
| 2007/0011040 A1 | 1/2007 | Wright et al. | |
| 2007/0288476 A1 | 12/2007 | Flanagan, III et al. | |
| 2007/0294057 A1 | 12/2007 | Crystal et al. | |
| 2007/0294132 A1 | 12/2007 | Zhang et al. | |
| 2007/0294705 A1 | 12/2007 | Gopalakrishnan et al. | |
| 2007/0294706 A1 | 12/2007 | Neuhauser et al. | |
| 2008/0091087 A1 | 4/2008 | Neuhauser et al. | |
| 2013/0238276 A1 | 9/2013 | Vock et al. | |

FOREIGN PATENT DOCUMENTS

| | | |
|---|---|---|
| WO | WO 2004/051303 | 6/2004 |
| WO | WO 2004/051304 | 6/2004 |

OTHER PUBLICATIONS

Handy et al., "Lessons Learned from Developing a Bluetooth Multiplayer-Game," 2nd International Conference on Pervasive Computing, Workshop on Gaming, [retrieved from internet, http://www.ipsi.fraunhofer.de/ambiente/pervasivegaming/papers/Handy_Pervasive2004.pdf] (pp. 7).

Battiti, Roberto, et al. "Location-Aware Computing: a Neutral Network Model for Determining Location in Wireless LANS" University of Trento: Department of Information and Communication Technology, Technical Report #DIT-02-0083, Feb. 2002 (pp. 1-16).

Azondekon et al., "Service Selection in Networks Based on Proximity Confirmation Using Infrared", http://www.scs.carleton.ca/~barbeau/Publications/2002/azondekon.pdf, International Conference on Telecommunications (ICT) Beijing, 2002 (5 Pages).

Bahl et al., "A Software System for Locating Mobile Users: Design, Evaluation, and Lessons", Technical Report MSR-TR-2000-12 Microsoft Research, [retrieved from internet, http://research.microsoft.com/~bahl/Papers/Pdf/radar.pdf], Feb. 2000 (13 Pages).

McCarthy et al., "RF Free Ultrasonic Positioning", 7th International Symposium on Wearable Computers Slides, Oct. 2003 (12 Pages).

Trolley Scan (PTY) LTD, "Trolleyponder®/ EcoTag®: Small and medium Production Systems", http://trolley.co.za/isosys.html (5 Pages).

Radioink, "Atrbitron & Scarborough Unveil New Mall Shopper Audience Measurement", http://radioink.com/HeadlineEntry.asp?hid=13542&pttodaysnews, Oct. 12, 2006 (2 Pages).

RFID Journal, "New Energy-Efficient RFID Tag", http://wwwrfidjournal.com/article/articleprint/718/-1/1, 2002 (2 Pages).

Schuman, "Smarter Smart Carts?", Storefront Backtalk, Feb. 16, 2005 (7 Pages).

McCarthy et al., "RF Free Ultrasonic Positioning", www.cs.bris.ac.uk/home/mccarthy/ (7 Pages).

Patent Cooperation Treaty, "International Search Report," issued by the International Searching Authority in connection with international counterpart PCT application No. PCT/US2006/010015, mailed Jul. 17, 2008, 3 pages.

(56) References Cited

OTHER PUBLICATIONS

Patent Cooperation Treaty, "Written Opinion of the International Searching Authority," issued by the International Searching Authority in connection with international counterpart PCT application No. PCT/US2006/010015, mailed Jul. 17, 2008, 9 pages.
"Out of the Lab and into the Field: A Report on the Extended Field Test of Arbitron's Portable People Meter in Manchester, England,"XP-002978594, Arbitron, 2000, 23 Pages.
Fang et al., "Design of a Wireless Assisted Pedestrian Dead Reckoning System—The NavMote Experience," vol. 54, Issue 6, Institute of Electrical and Electronics Engineers (IEEE), Dec. 2005 (16 pages).
Bernstein et al., "An Introduction to Map Matching for Personal Navigation Assistants," New Jersey TIDE Center, New Jersey Institute of Technology, Aug. 1996 (17 pages).
Kerschbaumer, Ken, "Who's Really Watching? How Cable's Digital Box Will Rock the Ratings World," Reed Business Information, a Division of Reed Elsevier, Inc., May 16, 2005 (4 pages).
McCarthy et al., "RF Free Ultrasonic Positioning," Department of Computer Science, University of Bristol, U.K., 2003 (7 pages).
Gentile et al., "Robust Location using System Dynamics and Motion Constraints," National Institute of Standards and Technology, Wireless Communication Technologies Group, Jun. 24, 2004 (5 pages).
Cricket Project, "Cricket v2 User Manual," MIT Computer Science and Artificial Intelligence Lab, Cambridge, U.S.A., Jan. 2005 (57 pages).
Holm, Sverre, "Technology Presentation," [online]. Sonitor Technologies, May 26, 2004 [retrieved on Oct. 13, 2004]. Retrieved from the Internet: <URL: www.sonitor.com/news/article.asp?id=62> (16 pages).
"The Nibble Location System," [online]. UCLA, May 21, 2001 [retrieved on Nov. 2, 2004]. Retrieved from the Internet: <URL: http://mmsl.cs.ucla.edu/nibble/>. (13 pages).
"New Sonitor Patent Combines Ultrasound and RFID" [online]. Sonitor Technologies, Feb. 17, 2005 [retrieved on Jun. 13, 2005]. Retrieved from the Internet: <URL: http://sonitor.com/news/article.asp?id=73>. (1 page).
"NIST Location System," [online]. Wireless Communication Technologies Group, National Institute of Standards and Technology, Mar. 12, 2004 [retrieved in Nov. 1, 2004]. Retrieved from the Internet: <URL: www.antd.nist.gov>. (2 pages).
Ferguson, Michael. "XTension Tech Notes," [online]. Sand Hill Engineering Inc., Dec. 10, 1998 [retrieved in Jan. 12, 2004]. Retrieved from the Internet: <URL: http://www.shed.com/artides/TN.proximity.html >. (9 pages).
"FM Wireless Microphone Module Kits," [online]. Horizon Industries, 2004 [retrieved on Sep. 30, 2004]. Retrieved from the Internet: <URL: www.horizonindustries.com/fm.htm>. (1 page).
"Arkon Sound Feeder II FM Transmitter," [online]. Yahoo Shopping, 2002 [retrieved on Sep. 29, 2004]. Retrieved from the Internet: <URL: http://store.yahoo.com/semsons-inc/arsoundfeedii.html>. (2 pages).
"Dust Networks—SmartMesh," [online]. Dust Networks Inc., 2002 [retrieved on Sep. 29, 2004]. Retrieved from the Internet: <URL: www.dustnetworks.com>. (2 pages).
Kanellos, Michael. "Dust Makes Mesh of Wireless Sensors," [online]. CNET News.com, Sep. 20, 2004 [retrieved on Sep. 29, 2004]. Retrieved from the Internet: <URL: http://www.news.com/Dust-makes-mesh-of-wireless-sensors/2100-1008_3-5374971.html?tag=item>. (2 pages).
"UHF Radio Data Logging System—GenII Data Logger," [online]. Amplicon, 2004 [retrieved on Sep. 29, 2004]. Retrieved from the Internet: <URL: www.amplicon.co.uk/dr-prod3.cfm/subsecid/10037/secid/1/groupid/11809.htm>. (3 pages).
"Eltek GenII Radio Data Logging System," [online]. Eltek Ltd., 2004 [retrieved on Sep. 29, 2004]. Retrieved from the Internet: <URL: www.elteckdataloggers.co.uk>. (4 pages).
"World's Smallest Hands Free Radio," [online]. Yahoo Shopping, 2004 [retrieved on Sep. 29, 2004]. Retrieved from the Internet: <URL: http://store.yahoo.com/latesttrends/worsmalhanfr.html>. (1 page).
"American Technology Corporation—Retailer Ads—AM & FM Sounds," [online]. Woody Norris, May 4, 2004 [retrieved on Sep. 29, 2004]. Retrieved from the Internet: <URL: www.woodynorris.com>. (3 pages).
"X1 Button Radio—The World's Smallest Radio," [online]. Exxun, 2004 [retrieved on Sep. 29, 2004]. Retrieved from the Internet: <URL: www.exxun.com>. (2 pages).
"Discovery Spy Motion Tracking System," [online]. Discovery Communications Inc., 2004 [retrieved on Sep. 14, 2004]. Retrieved from the Internet: <URL: http://shopping.discovery.com/stores/servlet/ProductDisplay? catalogId=10000&storeId=10000&lanlan=-1&productId=53867&partnumber=689638>. (3 pages).
"University Library Navigation Enabled by Ekahau," [online]. Directions Magazine, Jun. 12, 2003 [Aug. 3, 2007]. Retrieved from the Internet: <URL: http://www/directionsmag.com/press.releases/index.php? duty=Show&id=7276&trv=1>. (3 pages).
"Ekahau Site Survey—Ekahau: Features," [online]. Ekahau, Inc., [retrieved on Mar. 12, 2004]. Retrieved from the Internet: <URL: http://www.ekahau.com/products/sitesurvey/ess20_features.html>. (3 pages).
"Ekahau Positioning Engine 2.1—Ekahau," [online]. Ekahau, Inc., [retrieved on Mar. 12, 2004]. Retrieved from the Internet: <URL: http://www.ekahau.com/products/positioningengine/>. (3 pages).
"Ekahau Positioning Engine 2.1 specifications—Ekahau," [online]. Ekahau, Inc., [retrieved on Mar. 12, 2004]. Retrieved from the Internet: <URL: http://www.ekahau.com/products/positioningengine/epe20_specifications.html>. (2 pages).
"Ekahau Positioning Engine 2.1 requirements—Ekahau," [online]. Ekahau, Inc., [retrieved on Mar. 12, 2004]. Retrieved from the Internet: <URL: http://www.ekahau.com/products/positioningengine/epe20_requirements.html>. (2 pages).
"Ekahau Positioning Engine 2.1 Case Studies—Ekahau," [online]. Ekahau, Inc., [retrieved on Mar. 12, 2004]. Retrieved from the Internet: <URL: http://www.ekahau.com/products/positioningengine/epe20_casestudies.html>. (2 pages).
"Ekahau Site Survey—Ekahau: Site Survey™ 2.0," [online]. Ekahau, Inc., [retrieved on Mar. 12, 2004]. Retrieved from the Internet: <URL: http://www.ekahau.com/products/sitesurvey/>. (3 pages).
"Ekahau Site Survey—Ekahau: Quick-FAQ," [online]. Ekahau, Inc., [retrieved on Mar. 12, 2004]. Retrieved from the Internet: <URL: http://www.ekahau.com/products/sitesurvey/ess20_faq.html>. (4 pages).
"Ekahau Positioning Engine 2.1 Features—Ekahau: Positioning in 802.11b Networks," [online]. Ekahau, Inc., [retrieved on Mar. 12, 2004]. Retrieved from the Internet: <URL: http://www.ekahau.com/products/positioningengine/epe20_features.html>. (2 pages).
"Ekahau Positioning Engine 2.1 Data Sheet". Ekahau, Inc., Nov. 24, 2003 (2 pages).
"DRM—III OEM Circuit Module," [online]. Point Research Corporation, Apr. 1, 2004, [retrieved on Jul. 2, 2010]. Retrieved from the Internet: <URL: http://web.archive.org/web/20040401214737/http://pointresearch.com/drm3_module.htm>. (3 pages).
Frauenfelder, Mark. "The Portable People Meter," [online]. The Feature.com, Mar. 26, 2004 [retrieved on Mar. 31, 2004]. Retrieved from the Internet: <URL: http://www.thefeature.com/article?artcleid=100464&ref=690405>. (3 pages).
Want et al., "Bridging Physical and Virtual Worlds with Electronic Tags," CHI '99, ACM Press, Apr. 1999 (8 pages).
Gaynor et al., "RF Tracking," Boston University (7 pages).

\* cited by examiner

METHODS AND APPARATUS FOR USING AUDIENCE MEMBER BEHAVIOR INFORMATION TO DETERMINE COMPLIANCE WITH AUDIENCE MEASUREMENT SYSTEM USAGE REQUIREMENTS

RELATED APPLICATIONS

This application is a continuation of International Patent Application No. PCT/US2006/010015, filed Mar. 17, 2006, which claims the benefit of U.S. Provisional Patent Application No. 60/662,604, filed Mar. 17, 2005, both of which are hereby incorporated herein by reference in their entireties.

FIELD OF THE DISCLOSURE

The present disclosure relates generally to media monitoring and, more particularly, to methods and apparatus for using audience member behavior information to determine compliance with audience measurement system usage requirements.

BACKGROUND

Consuming media presentations generally involves listening to audio information and/or viewing video information such as, for example, radio programs, music, television programs, movies, still images, etc. Media-centric companies such as, for example, advertising companies, broadcast networks, etc. are often interested in the viewing and listening interests of their audience to better market their products and/or to improve their programming. A well-known technique often used to measure the exposure and/or number of audience members exposed to media involves awarding media exposure credit to a media presentation for each audience member that is exposed to the media presentation.

Media exposure credit is often measured by monitoring the media consumption of audience members using, for example, personal portable metering devices (PPMs), also known as portable metering devices and portable personal meters. A PPM is an electronic device that is typically worn (e.g., clipped to a belt or other apparel) or carried by an audience member and configured to monitor media consumption (e.g., viewing and/or listening activities) using any of a variety of media monitoring techniques. For example, one technique for monitoring media consumption involves detecting or collecting information (e.g., ancillary codes, signatures, etc.) from audio and/or video signals that are emitted or presented by media presentation devices (e.g., televisions, stereos, speakers, computers, video display devices, video games, mobile telephones, etc.).

While wearing a PPM, an audience member or monitored individual performs their usual daily routine, which may include listening to the radio and/or other sources of audio media and/or watching television programs and/or other sources of visual media. As the audience member is exposed to (e.g., views, listens to, etc.) media, a PPM associated with (e.g., assigned to and carried by) that audience member detects audio and/or video information associated with the media and generates monitoring data. In general, monitoring data may include any information that is representative of (or associated with) and/or that may be used to identify a particular media presentation (e.g., a song, a television program, a movie, a video game, etc.) and/or to identify the source of the media presentation (e.g., a television, a digital video disk player, a stereo system, etc.). For example, the monitoring data may include signatures that are collected or generated by the PPM based on the media, audio codes that are broadcast simultaneously with (e.g., embedded in) the media, infrared (IR) or radio frequency (RF) signals emitted by a remote control device and/or emitted by a transceiver configured to transmit location information, information supplied by the audience member using any of a variety of data input devices, etc.

In several known systems, information associated with the location of an audience member is used to determine or to collect media monitoring information. For example, location information may be used to identify media (e.g., billboards) to which audience members were exposed and/or to better understand the environments within which audience members consume different types of media information. Thus, location information may be used to track and log the location of an audience member as the audience member performs a daily routine.

Location information may be collected using several known systems such as, for example, location code emitters and broadcast positioning systems. Location code emitters are typically configured to emit location codes associated with respective areas within which the location code emitters are disposed. The codes may be, for example, acoustic codes, audio codes, RF codes, IR codes, Bluetooth® codes, etc., that are detected by PPMs worn or carried by audience members. More specifically, the location codes may be automatically and continuously or intermittently detected and collected by a PPM as the PPM is moved from area to area.

Broadcast positioning systems (e.g., global positioning systems, radio frequency positioning systems, etc.) are typically configured to work in combination with position monitors or PPMs that are worn or carried by audience members. The position monitors are configured to determine and/or collect location information associated with the location of audience members based on information emitted by the broadcast positioning systems.

Media monitoring information and location information are often used to credit media presentations (to which audience members have been exposed) as having been consumed by the audience member. However, credit given to media presentations based on exposure may inaccurately or inconsistently represent actual media consumption. For example, an audience member may be within hearing and viewing distance of a television program, but may be inattentive, preoccupied or otherwise not actively consuming the content of the television program. Thus, assigning consumption credit to media based on exposure, alone, may result in inaccurate audience measurement data.

Another drawback of the traditional operation of PPMs stems from the dependency on the audience member's ability/willingness to comply with PPM wearing/carrying requirements. More specifically, for example, the data collected by the PPM represents media exposed to the audience member provided that the PPM is sufficiently near the audience member to detect such media. As a result, each audience member who agrees to be monitored is required to comply with prescribed carrying/wearing requirements. Such requirements, generally identify a minimum percentage of daily waking time during which the audience member is required to carry/wear the PPM, but may also (or instead) identify specific periods of time during which the PPM must be carried/worn or a minimum number of PPM carrying/wearing hours per day. If such requirements are not met, media exposure may go undetected or media exposure may be inaccurately detected if, for example, the PPM detects a media presentation to which the audience member was not exposed because the audience member was not within proximity of the PPM when that particular media presentation was detected.

Compliance verification techniques are often as difficult to implement as attempting to enforce audience members to comply with appropriate operating guidelines of the PPM. An audience member is often relied on to comply with appropriate operating guidelines of PPM usage. However, human factors such as forgetfulness, personal preference, stress, etc. often affect negatively the intentions of audience members to fully comply in their usage of PPMs.

DETAILED DESCRIPTION

Although the following discloses example systems including, among other components, software executed on hardware, it should be noted that such systems are merely illustrative and should not be considered as limiting. For example, it is contemplated that any or all of these hardware and software components could be embodied exclusively in hardware, exclusively in software, or in any combination of hardware and software. Accordingly, while the following describes example systems, persons having ordinary skill in the art will readily appreciate that the examples provided are not the only way to implement such systems.

In general, the example methods and apparatus described herein may be used to analyze the motions, movements, locations, and/or behaviors of audience members in the course of their exposure to media sources or media presentations to aid in determining whether such media presentations were actually consumed by the audience members. In addition, the methods and apparatus described herein may be used to determine if audience members are complying with PPM carrying/wearing requirements or PPM usage requirements.

As described in greater detail below, information about the motion, the movements, and the locations of an audience member while exposed to a media presentation may be used to aid in determining whether the audience member was sufficiently attentive to the presentation, to credit the presentation with consumption by the audience member, and to aid in determining whether the audience member is complying with PPM carrying/wearing requirements. For example, the nature of an audience member's movements (or lack thereof) may indicate whether the audience member is distracted, inattentive, (likely) sleeping, not complying with the PPM wearing/carrying requirements, exercising, moving too quickly to be consuming the presentation, etc.

In particular, the example methods and apparatus described herein may be implemented using, for example, personal portable meters (PPMs) worn or carried by audience members and location information systems (e.g., a global positioning system (GPS), RF towers/transceivers for triangulation, etc.), and may be used to collect audience member movement information and/or media exposure information and to analyze such movement and/or exposure information. Additionally, the movement and/or exposure information may be used to determine the behavior of an audience member to determine if the audience member is sufficiently exposed to media presentations. In this manner, media presentations (e.g., audio, video, still images, Internet information, computer information, etc.) may be given appropriate media consumption credit.

Figure 1:
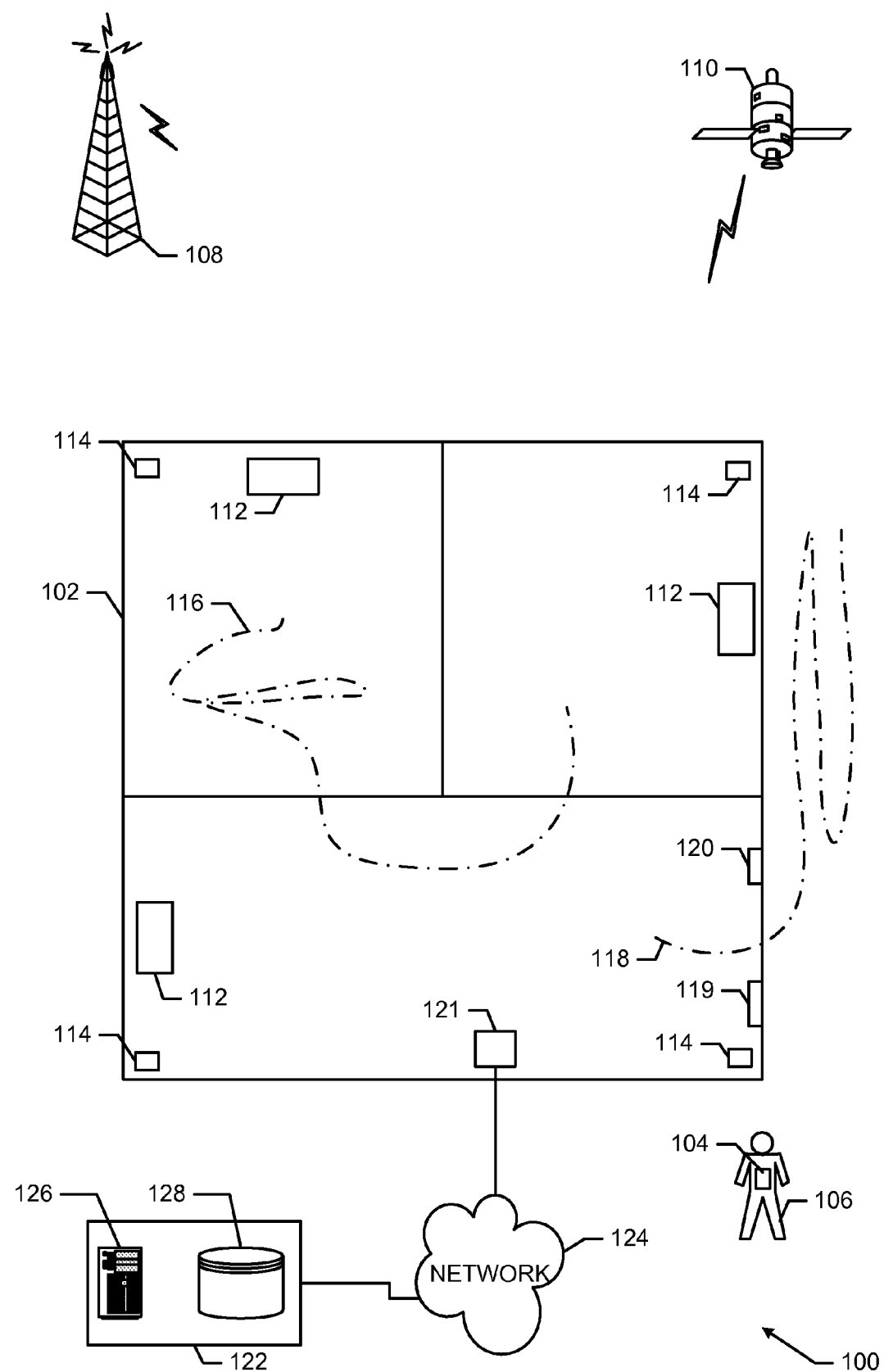
FIG. 1 illustrates an example system for collecting media exposure information and an example area in which audience members may be exposed to media presentations.

For purposes of clarity, the example methods and apparatus are described herein with respect to an example geographic area 100, which includes indoor and outdoor regions, that is shown in FIG. 1 as being associated with a household 102. However, the example methods and apparatus described herein may be used in any area or environment.

Information about an audience member's behavior may be determined/estimated using location information, motion information, and/or movement information. Location information may include, for example, geographic, global, or position coordinates that, when analyzed, may be used to determine the movements of a person or an audience member from one location to another. As described in greater detail below, location information may be collected, obtained, generated, etc. using any suitable location detection devices, location detection systems, and/or location detection techniques. Specifically, the location detection devices described below may be worn or otherwise carried by a person or audience member. The location detection systems disclosed in U.S. Application Ser. No. 60/613,646 and U.S. Application Ser. No. 60/614,939 may also be used to detect location information.

Motion information may include, for example, body displacement measurements or motion measurements associated with the relatively small movements or motion of an audience member's body. Motion information may be used to analyze the body movements of an audience member as the audience member consumes media. Body movements may include shifting or fidgeting while a person sits on a couch and passively consumes media. Body movements may also include, for example, dance movements, exercise movements, and/or any other body movements of a person, at least some of which may be the result of the person actively participating in activities (e.g., exercising, cooking, etc.) associated with the media program. As described in greater detail below, motion information may be collected, obtained, generated, etc. using any suitable motion detection devices and/or motion detection techniques. Specifically, the motion detection devices described below may be worn or carried by a person.

Movement information may be generated using the location information and is indicative of an audience member's transition from one location (e.g., first location coordinates or a first room) to a substantially different location (e.g., second location coordinates or a second room). While motion information can be used to analyze a person's body movements while the person stays (e.g., stands, sits, etc.) in substantially the same location (e.g., at substantially the same location coordinates), movement information may be used to analyze when a person is moving between different rooms of a household or between substantially different spaces (e.g., substantially different location coordinates) within a room of the household. A person generating relatively large amounts of motion may be very attentive to a television presentation because the person remains (e.g., sits, stands, etc.) at substantially the same location (e.g., in front of and/or exposed to the television) while generating the motion. In contrast, a person generating relatively large amounts of movement may be relatively less attentive to a television presentation because the person is likely moving away from the television or moving to spaces that decrease the person's exposure to the television.

Location information and motion information may be continuously collected in indoor environments and/or outdoor environments via, for example, an example PPM 104 that may be carried or worn by an audience member 106 as shown in FIG. 1. The example PPM 104 may be implemented as a standalone device having a pager-like design. Alternatively, the example PPM 104 may be integrated or jointly configured with a mobile telephone as described below in connection with FIG. 14. Although the example methods and apparatus are described herein relative to the example PPM 104 and other devices (e.g., other PPMs, the PPM smartphone 1400 of FIG. 14) substantially similar or identical to the example PPM 104, location information and motion information may also be continuously collected based on identification tags or metering tags (e.g., the example identification tag 1600 of FIG. 16) or any other portable device (e.g., a tag, a meter, etc.) that may be worn or carried by a person. The identification tag 1600 may be worn or carried by an audience member (e.g., the audience member 106) and used in combination with or instead of the example PPM 104. For example, the identification tag 1600 may be used to detect the location of the audience member 106 by configuring a location information system (e.g., the base units 114 of FIGS. 1 and 3) to measure the proximity of the identification tag 1600 to the location information system, the presence of the identification tag 1600 within a room or the household 102, or the location (e.g., the location coordinates) of the identification tag 1600 within a room or the household 102. When the identification tag 1600 is used in combination with the example PPM 104, the PPM 104 may collect media monitoring information while the location information system collects location or proximity information based on the identification tag 1600.

The example PPM 104 may include one or more location detection devices and/or motion detection devices described below in connection with FIG. 2 that the PPM 104 may use to monitor the audience member 106. The location detection devices and motion detection devices may be configured to enable the example PPM 104 to collect audience member location information and/or motion information in indoor environments and/or outdoor environments. In this manner, when an audience member moves among indoor areas and outdoor areas a substantially continuous location/motion history may be tracked or logged for each audience member and subsequently analyzed to develop movement information.

Media monitoring information may include any information associated with media that is consumed (e.g., viewed, listened to, interacted with, etc.) by an audience member. Media presentations may include, for example, television programming, radio programming, movies, songs, advertisements, Internet information, and/or any other video information, audio information, still image information, and computer information to which a person may be exposed. Media monitoring information may be generated based on, for example, audio codes, signatures, radio frequency (RF) codes, and/or any other codes, information, or identifiers that may be extracted from or otherwise associated with a media presentation to which an audience member is exposed. As described in greater detail below, media monitoring information may be collected generated, obtained, etc. using any suitable media consumption detection device and/or any suitable media consumption detection technique.

In one implementation, the PPM 104 may tag media monitoring information with respective media location information to generate movement-annotated media monitoring information. In other words, in a substantially real-time process, the PPM 104 may substantially continuously combine time-stamped media monitoring information with time-stamped location information that corresponds to the locations at which the PPM 104 collected the time-stamped media monitoring information. In this manner, subsequent analyses can be used to determine if the audience member 106 was compliant with the usage requirements or guidelines of the PPM 104 and to determine the locations at which the audience member 106 was exposed to particular media. Alternatively, time-stamped media monitoring information may be combined with time-stamped location information in a post collection process. For example, time-stamped media monitoring information and time-stamped location information may be stored within a memory (e.g., the memory 204 of FIG. 2) of the PPM 104 or may be stored in a storage device that is separate from the PPM (e.g., another information processing system) and may then be combined, joined, or otherwise interrelated in a subsequent process to generate location-annotated media monitoring information. Other information with which the collected information may be annotated includes, for example, audience identification information.

Movement information and media monitoring information may be used to better determine how to credit an exposure to a media presentation. For example, movement information and media monitoring information may be analyzed to determine the behaviors of audience members during their exposure to media presentations. The audience member behaviors may then be analyzed to determine when and how much credit is to be awarded or given to a media presentation for a given exposure. Media exposure credits are typically used to measure or quantify the quantity of exposures of a media presentation to one or more audience members. Traditional methods for measuring media consumption typically track or log the media presentations to which an audience member is exposed and award media exposure credit to a media source or presentation when an audience member is in the vicinity of that media presentation or, more generally, within a distance of the media presentation at which the audience member is likely able to consume the media. However, these traditional methods may produce inconsistent or inaccurate results if the audience member is in the vicinity of a media presentation, but is not sufficiently attentive (e.g., the audience member is sleeping, distracted, etc.) during exposure to the media presentation to credit with actual consumption.

The example methods and apparatus described herein may be used to credit media presentations by detecting the attentiveness, reactions, direction of movement, etc. of audience members exposed to the presentations. In an example implementation, if the audience member 106 is consuming television media and it is determined via analyses of movement information that the audience member 106 is frequently moving from one room to another, the television program or television programs to which the audience member 106 is exposed may only be given partial credit. For example, the example methods and apparatus may be used to determine that the audience member 106 has a relatively higher level of attentiveness if the audience member 106 moves away from a living room television and walks into the kitchen or another room for only a brief amount of time than if the audience member 106 were to move to an office or another room for a relatively longer amount of time. A television media presentation may then be given relatively more exposure credit when the attentiveness of the audience member 106 is indicated as relatively higher. In contrast, if the audience member 106 is consuming radio media while moving between various rooms in the household 102, the radio program or radio programs may be given full credit because effective consumption of the radio program may only require that the audience member be within audible range of the radio program. Additionally, location information and motion information may be analyzed to detect small movements or motion of an audience member to determine if the audience member is sleeping, distracted, not adequately exposed to or otherwise not sufficiently attentive to a media source or media presentation. These analyses may be performed as a substantially real time process or as a post process. In either case, the analyses may be used to determine the manner in which credit should be awarded to each exposure to a media presentation.

The example methods and apparatus described herein may also be used to credit a media presentation based on the manner in which and the degree to which audience members are compliant to PPM carrying/wearing (usage) requirements or guidelines. For example, motion information or location information associated with the PPM 104 indicating that the PPM 104 was stationary for an excessively long period of time may be used to conclude that the PPM 104 was not likely worn/carried by the audience member 106 during that period of time. If the PPM 104 was not worn for a sufficiently lengthy period of time, media monitoring information collected during that period of time may be disregarded. In addition, notice of non-compliant behavior may be sent to the audience member 106 in response to determining non-compliance of the audience member's 106 usage of the PPM 104. The notice may be sent via any message delivery means such as, for example, mail, email, phone, and/or via a display or audio alert of the PPM 104.

If the motion information or location information and the media monitoring information are analyzed in real time by, for example, the PPM 104, the results of the analyses may be used to determine if the audience member 106 should be prompted for information. For example, the audience member 106 may be prompted via the PPM 104 to provide feedback via the PPM 104 regarding whether they are consuming a detected media presentation or are merely in the vicinity of the detected media presentation. Additionally, the audience member 106 may be prompted to express approval or disapproval of a media presentation, or may submit his or her approval or disapproval without being prompted. The audience member 106 may alternatively or additionally be prompted for other information such as, for example, their subjective rating of one or more media presentations, whether they would view the media presentation or a related media presentation again, the number of unmonitored individuals who are also present and consuming the media presentation, etc. Additionally, or instead, the prompting may instruct the audience member 106 to move or shake the PPM 104 so that the motion detection devices residing within the PPM 104 are activated. The activation of the motion detection devices may cause information concerning compliance of wearing/carrying requirements to be logged. In this manner, the PPM 104 need not necessarily be carried by the audience member 106, rather the PPM 104 need only be within arms length of the audience member 106 (or at least sufficiently close to the audience member 106) to accurately capture information about the audience member's exposure to media presentations.

In addition, the example methods and apparatus described herein may use location information, motion information, and/or the media monitoring information to analyze audience members' reactions to media presentations and/or to analyze audience members' activities during media presentations. For example, the amount or type of credit given to a media presentation may depend on activities related to or portrayed by a media presentation. Activities of interest may include cooking while watching a cooking show, exercising while watching a fitness show, dancing while listening to music, etc.

The example methods and apparatus described herein may also be used to implement behavior recognition techniques that may be used to recognize media consumption related behaviors of audience members. More specifically, behavior recognition techniques may be used to recognize repeated sequences of events that audience members often perform in a typical day during their exposure to media presentations. Behavior recognition techniques may include event pattern recognition techniques (i.e., event sequence recognition techniques) that involve detecting patterns in sequences of events within daily routines of one or more audience members. For example, on a typical work day, a sequence of events for one or more audience members may involve stopping for gasoline followed by purchasing breakfast at a drive-thru while commuting to work. Such sequences of events may be recognized as typical morning routines performed by a certain audience member(s). An example use of behavior recognition techniques may involve analyzing demographic information of audience members and forming general conclusions about demographic groups related to media consumption. Another example use of behavior recognition techniques involves differentiating between behaviors of an audience member in response to advertising and behaviors of an audience member related to a usual routine.

As shown in FIG. 1, the household 102 and the audience member 106 wearing the PPM 104 are located within the example geographic area 100. As described below, the PPM 104 may be used to collect location information, motion information, and media monitoring information within the household 102, outside of the household 102, within structures other than the household 102, outdoors, etc.

The PPM 104 may be configured to substantially continuously generate, obtain, and/or collect media monitoring information, location information, and motion information. As described in greater detail below in connection with FIG. 2, the PPM 104 may include one or more media detection devices used to detect presented media and to generate or collect media monitoring information or media-related data based on, for example, audio signals, visual signals, RF signals, infrared (IR) signals, etc. In addition, the PPM 104 may include one or more location or positioning devices that enable the PPM 104 to collect location or position information from one or more location information systems and/or to send location information to one or more location information systems. The example geographic area 100 includes one or more location information systems that may be used to communicate location information to/from the PPM 104.

The location information systems may be implemented using, for example, one or more radio frequency (RF) transceiver towers represented in FIG. 1 by the RF transceiver tower 108 and/or one or more satellites represented in FIG. 1 by a satellite 110. In addition, the interior environment of the household 102 may include one or more location information systems described below.

The PPM 104 may collect media monitoring information (e.g., ancillary codes, signatures, etc.) associated with any media (e.g., video, audio, movies, music, still pictures, advertising, etc.) to which the audience member 106 is exposed. For example, the PPM 104 may be configured to obtain audio codes, generate or collect signatures, etc. that may be used to identify video programs (e.g., DVD movies, television programming, etc.), audio programs (e.g., CD audio, radio programming, etc.), etc. In particular, the household 102 includes a plurality of media delivery centers 112, each of which may include a media delivery device such as, for example, a television, a radio, etc. as well as a media playback device such as, for example, a DVD player, a VCR, etc. Using one or more media detection devices described below in connection with FIG. 2, the PPM 104 may collect media monitoring information associated with media presented or delivered by one or more of the media delivery centers 112 and to which the audience member 106 may be exposed.

Additionally, the PPM 104 may be configured to receive audio codes and/or RF codes associated with other forms of media such as, for example, billboards (not shown) or any other form of publicly viewable advertising or media. For example, each billboard may include an audio broadcasting device and/or an RF broadcasting device configured to emit a billboard code that uniquely identifies that billboard. If the PPM 104 is proximate to a billboard, the PPM 104 may obtain the billboard code as media monitoring information, thereby indicating that the audience member 106 was exposed to the billboard. In addition, the PPM 104 may be configured to obtain direction information via, for example, an electronic compass, and log the direction in which the audience member 106 was facing or traveling so that subsequent data analyses may determine if the audience member 106 was likely facing the billboard.

Location information collected by the PPM 104 may be used to generate movement information and/or to analyze the movements of the audience member 106. For example, movement information may be stored as a plurality of location coordinates or location information that may be converted to movement information during subsequent processing by generating movement paths that indicate or track the movements of an audience member. The PPM 104 may also include motion detection devices as described below in connection with FIG. 2. Motion detection devices may be used to generate motion information associated with the relatively small movements (e.g., shifting, fidgeting, exercising, etc.) of an audience member's body.

The RF transceiver tower 108 may be used in combination with any RF communication technology such as, for example, a cellular or mobile communication technology (e.g., GSM, CDMA, TDMA, AMPS, etc.) In one example configuration, the RF transceiver tower 108 may be configured to transmit or broadcast position information and/or any type of signal that may be used by the PPM 104 to generate location information. For example, the RF transceiver tower 108 may transmit information having geographic location information and time codes. More specifically, the RF transceiver tower 108 may be associated with a particular or unique set of geographic location coordinates (i.e., geographic location information), that define or indicate the location of the RF transceiver tower 108 within a global positioning grid. The time codes may be associated with a time at which a particular signal is transmitted by the RF transceiver tower 108.

The geographic location information and the time codes received from a plurality of RF transceiver towers may be used by the PPM 104 to perform triangulation processes to determine the location(s) of the PPM 104. Triangulation processes are well known in the art and, thus, are not described further herein. Although the RF transceiver tower 108 is depicted as being located in an outdoor environment, the PPM 104 may include location technologies that communicate with the RF transceiver tower 108 when the PPM 104 is located within indoor environments (e.g., within the household 102) or outdoor environments.

The satellite 110 may also be used to communicate location information to/from the PPM 104. For example, the satellite 110 may be used to implement any satellite positioning system (SPS) such as, for example, the global positioning system (GPS) that continuously broadcasts position-related information. In this manner, the PPM 104 may receive the position-related information from the satellite 110 to determine movement information associated with the location(s) of the PPM 104.

One or more location information systems may also be located within the household 102. As shown in FIG. 1, an example location information system includes a plurality of base units 114. The base units 114 may include one or more location-based technologies, some of which are described below in connection with FIG. 3 and may be configured to work cooperatively with the PPM 104 to substantially continuously generate location information associated with the location of the PPM 104 as the audience member 106 moves among various areas within or around the household 102.

Example movement information is shown in FIG. 1 as a first movement path 116 and a second movement path 118. The first movement path 116 is an example of movement information that is collected as, for example, the audience member 106 moves from one room to another. The second movement path 118 is an example of movement information that is collected as the audience member 106 moves from the inside of the household 102 to a location outside of the household 102. The example movement paths 116 and 118 may be generated using location information collected by the PPM 104 in combination with any one or more suitable location information systems (e.g., the RF transceiver tower 108, the satellite 110, the base units 114, etc.). For example, the location information used to generate the movement path 116 may be generated using information received from the RF transceiver towers 108, the base units 114, or a combination thereof.

The location information used to generate the movement path 118 may include location information generated using location information systems that function for indoor use and/or outdoor use. One such location information system may be, for example, the RF transceiver tower 108. Alternatively, location information associated with the movement path 118 may be generated using a combination of location information systems such as, for example, a first location information system that functions primarily or only in indoor environments and a second location information system that functions primarily or only in outdoor environments. In that case, the first location information system for indoor use may be, for example, the base units 114 and the second location information system may be, for example, the satellite 110. Using two location information systems (e.g., the base units 114 and the satellite 110) in combination may require a hand-off process to ensure that the PPM 104 transitions substantially seamlessly from working with one location information system to working with another. An example handoff process may include a software routine that continuously searches for signals from both location information systems and works with the location information system providing the strongest signal (e.g., the signal having the highest power level). Other software and/or circuitry may provide hysteresis to enable minimum/maximum threshold levels of signal strength to be used to prevent the PPM 104 from continuously and/or rapidly switching back and forth between location information systems.

An example compliance status device 119 may be configured to obtain compliance status from the PPM of each audience member in the household 102 and display the compliance status. The compliance status device 119 includes a display that may be implemented using, for example, a plurality of LEDs. Each of the LEDs may correspond to one of the audience members. Each LED may be configured to, for example, glow red when the corresponding audience member is non-compliant and glow green when the corresponding audience member is compliant. Each PPM may be configured to wirelessly transmit compliance status information directly to the compliance status device 119 and/or each PPM may be configured to transmit compliance status information to a central collection facility (e.g., the central facility 122 described below), which may then communicate the compliance status information to the compliance status device 119. The compliance status device 119 may also be communicatively coupled to a home processing system (e.g., the home processing system 121 described below).

Although only one compliance status device 119 is shown in FIG. 1, a plurality of compliance status devices may be located throughout the household 102. For example, each of the plurality of compliance status devices may be located in each room of the household 102. Each compliance status device may be configured to indicate via, for example, LEDs, when an audience member is in the room corresponding to that compliance status device. An example implementation of the compliance status device 119 is illustrated in greater detail in FIG. 15. Also, although the compliance status device 119 is depicted as being separate from the home processing system 121, the compliance status device 119 and/or the operations, processes, or function of the compliance status device 119 may be implemented using the home processing system 121. In this case, a separate compliance status device (e.g., the compliance status device 119) is not necessary, and the home processing system 121 may be configured to display compliance status information of household members via, for example, a graphical user interface and communicate the compliance status information to the central facility 122. Of course, the compliance status device 119 may be implemented using any other processing system or apparatus (e.g., one or more of the base units 114, a security system 120, etc.).

A security system 120 may be configured to determine when audience members of the household 102 leave or enter the household 102. For example, the security system 120 may be communicatively coupled to door sensors (not shown) that communicate signals to the security system 120 indicating that a door has been opened or that a person has entered or left the household 102. The door sensors may be implemented using magnetic reed switches and/or optical sensors. A magnetic reed switch may be configured to indicate that a door is open and an optical sensor may be configured to indicate that an audience member has left or entered the household 102. The security system 120 may be communicatively coupled to the compliance status device 119 and/or a home processing system (e.g., the home processing system 121 described below).

A home processing system 121 may be configured to communicate with the PPM 104 and/or the base units 114. In particular, the home processing system 121 may be communicatively coupled to one or more docking stations (not shown) configured to receive the PPM 104 and communicatively couple the PPM 104 to the home processing system 121. The audience member 106 may periodically (e.g., nightly) place the PPM 104 in a docking station to enable the home processing system 121 to obtain collected media monitoring information, location information, motion information, and/or any other information stored in the PPM 104. Alternatively, the PPM 104 may communicate with the base units 114 via wireless and/or hardwired communications and may periodically communicate collected information to the home processing system 121 via one or more of the base units 114.

The home processing system 121 is communicatively coupled to a central facility 122 via a network 124. The central facility 122 is remotely located from the household 102 and is communicatively coupled to the household 102 and other monitored sites (e.g., other households) via the network 124. The central facility 122 may obtain media consumption data, media monitoring data, location information, motion information, and/or any other monitoring data that is collected by various media monitoring devices such as, for example, the PPM 104. The central facility 121 includes a server 126 (i.e., a central processor system) and a database 128 that may be implemented using any suitable memory and/or data storage apparatus and techniques. The server 126 may be implemented using, for example, a processor system similar or identical to the example processor system 410 depicted in FIG. 4 that is configured to store information collected from the PPM 104 in the database 128 and to analyze the information. In addition, the server 126 may be configured to generate calibration information for the PPM 104 and/or other PPMs based on audio information or audio samples collected during an acoustic characterization process or calibration process performed within the household 102.

The network 124 may be used to communicate information between the central facility 122 and devices or apparatus in the monitored household 102. For example, the network 124 may be communicatively coupled to the base units 114, the PPM 104, and/or the home processing system 121. The network 124 may be implemented using any suitable communication interface including, for example, telephone lines, a cable system, a satellite system, a cellular communication system, AC power lines, etc.

Figure 2:
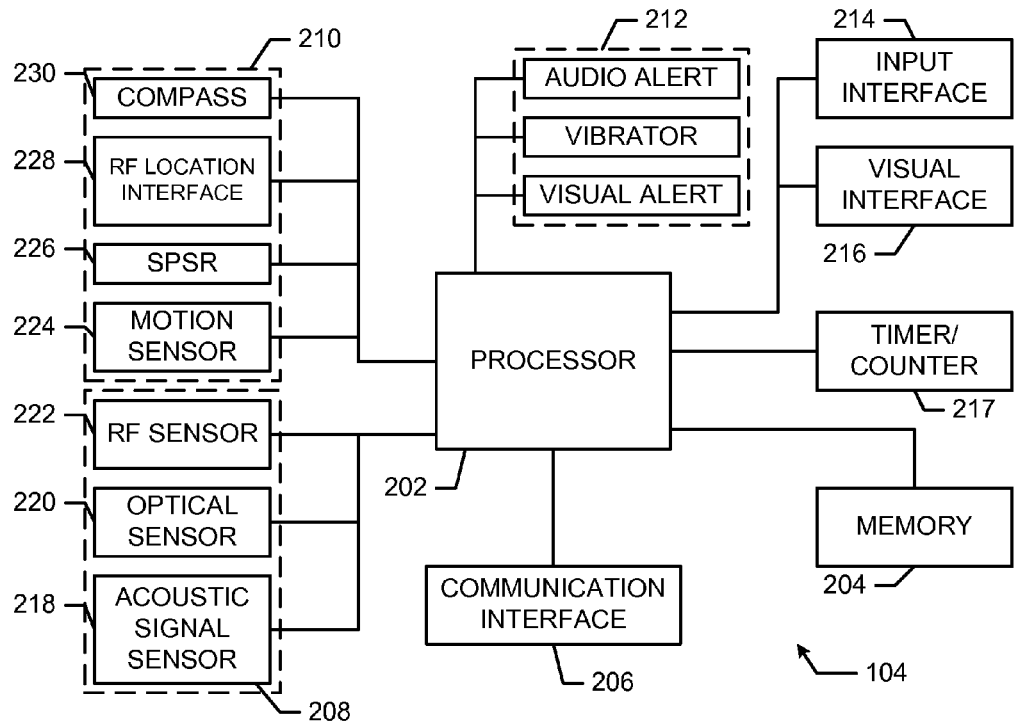
FIG. 2 is a block diagram of the example personal portable metering device of FIG. 1.

FIG. 2 is a block diagram of the example PPM 104 of FIG. 1. As described above, the PPM 104 may be used to monitor the media consumption activities of an audience member (e.g., the audience member 106 of FIG. 1) in addition to location information and motion information associated with those media consumption activities. In general, the PPM 104 includes electronic components configured to detect and collect media monitoring information, location information, and motion information and communicates the information to the home processing system 121 and/or the central facility 122 (FIG. 1) for subsequent analyses. As shown in FIG. 2, the PPM 104 includes a processor 202, a memory 204, a communication interface 206, a plurality of media monitoring information sensors 208, a plurality of location and motion sensors 210, a plurality of audience alerts 212, an input interface 214, a visual interface 216, and a timer/counter 217, all of which are communicatively coupled as shown.

The processor 202 may be any processor suitable for controlling the PPM 104 and managing or processing monitoring data related to detected media consumption or presentation information, location information, and/or motion information. For example, the processor 202 may be implemented using a general purpose processor, a digital signal processor, or any combination thereof. The processor 202 may be configured to perform and control various operations and features of the PPM 104 such as, for example, setting the PPM 104 in different operating modes, controlling a sampling frequency for collecting media monitoring information, location information, and motion information, managing communication operations with other processor systems (e.g., the base units 114, the home processing system 121, the server 126 of FIG. 1), selecting location information systems (e.g., the RF transceiver tower 108, the satellite 110, and the base units 114), etc.

The memory 204 may be used to store collected media monitoring information, program instructions (e.g., software, firmware, etc.), program data (e.g., location information, motion information, etc.), and/or any other data or information required to operate the PPM 104. For example, after acquiring location information, motion information, and/or media monitoring information, the processor 202 may time stamp the acquired information and store the time-stamped information in the memory 204. The memory 204 may be implemented using any suitable volatile and/or non-volatile memory including a random access memory (RAM), a read-only memory (ROM), a flash memory device, a hard drive, an optical storage medium, etc. In addition, the memory 204 may be any removable or non-removable storage medium.

The communication interface 206 may be used to communicate information between the PPM 104 and other processor systems including, for example, the base units 114, the home processing system 121, and/or the server 126 of FIG. 1. The communication interface 206 may be implemented using any type of suitable wired or wireless transmitter, receiver, or transceiver such as, for example, a Bluetooth® transceiver, an 802.11 (i.e., Wi-Fi®) transceiver, a cellular communications transceiver, an optical communications transceiver, etc.

The media monitoring information sensors 208 include an acoustic signal sensor 218, and optical sensor 220, and an RF sensor 222. The example PPM 104, via the acoustic signal sensor 218, the optical sensor 220, and the RF sensor 222, observes the environment in which the audience member 106 is located and monitors for media presentation and/or signals associated with media presentations. When media presentations are detected, the example PPM 104 logs or stores a representation of the media content in the memory 204 and/or identifies the content, along with the time at which the content is detected.

The acoustic signal sensor 218 may be, for example, a condenser microphone, a piezoelectric microphone or any other suitable transducer capable of converting audio or acoustic signal information into electrical information. The acoustic signal sensor 218 may be configured to detect acoustic signals in the human audible range or non-human audible range (e.g., ultrasound acoustic signals). The optical sensor 220 may be, for example, a light sensitive diode, an IR sensor, a complimentary metal oxide semiconductor (CMOS) sensor array, a charge-coupled diode (CCD) sensor array, etc. The RF sensor 222 may be, for example, a Bluetooth® transceiver, an 802.11 transceiver, an ultrawideband RF receiver, and/or any other RF receiver and/or transceiver. While the example PPM 104 of FIG. 1 includes the acoustic signal sensor 218, the optical sensor 220, and the RF sensor 222, the example PPM 104 need not include all of the sensors 218, 220, and 222. For example, the acoustic signal sensor 218 is sufficient to identify audio/video or program content via program characteristics, such as signatures or, if they are present, audio codes. Additionally, the optical sensor 220 is sufficient to identify program content via program characteristics, such as signatures or, if present, video codes. However, because video monitoring generally requires a line of sight between the PPM 104 and the media delivery device, one particularly advantageous example includes the acoustic signal sensor 218 and the optical sensor 220.

The location and motion sensors 210 are configured to detect location-related information and/or motion-related information and to generate corresponding signals that are communicated to the processor 202. More specifically, the location and motion sensors 210 may include a motion sensor 224, a satellite positioning system (SPS) receiver 226, an RF location interface 228, and a compass 230.

Some of the location and motion sensors 210 may be configured to receive location-related information (e.g., encoded information, pluralities of fragmented information, etc.) and to perform any processing necessary to convert the received information to location information that indicates the location at which the PPM 104 is located. For example, location information may be derived using triangulation techniques, whereby the PPM 104 may receive RF signals from three or more RF transmitters (e.g., three or more of the base units 114 of FIG. 1). In this case, a single RF signal from any one RF transmitter may be useless for generating location information. However, the location information may be generated by triangulating or processing a combination of RF signals from a plurality of RF transmitters. Thus, some of the location and motion sensors 210 may be configured to process received location-related signals to generate location information and others of the location and motion sensors 210 may be configured to process the received location-related signals in combination with software executed on the processor 202 to generate location information. Still others of the location and motion sensors 210 may communicate any received information to the processor 202 for processing.

The motion sensor 224 may be used to detect relatively small body movements of an audience member (e.g., the audience member 106), generate motion information related to the body movements, and communicate the motion information to the processor 202. The motion sensor 224 may be implemented using any suitable motion detection device such as, for example, a mercury switch, a trembler, a piezo-gyroscope integrated circuit (IC), an accelerometer IC, etc.

The motion information generated by the motion sensor 224 may be used to determine if the audience member 106 is wearing or carrying the PPM 104. In addition, the motion information may be used to determine if the audience member 106 is consuming (e.g., paying attention to) a media presentation. For example, if the motion information indicates that the audience member 106 is substantially motionless, an analysis of such motion information may indicate that the audience member 106 was likely sleeping and, thus, not consuming a media presentation. Alternatively, if the motion information indicates that the audience member 106 is generating an extraordinary amount of motion information, an analysis of such motion information may indicate that the audience member is either participating with the media presentation (e.g., dancing, exercising, cooking, etc.) or is moving around too much to adequately consume the media presentation. In either case, analyses of the motion information may be used to prompt the audience member 106 via one of the audience alerts 212 to confirm if the audience member 106 is actively consuming the media presentation.

The SPS receiver (SPSR) 226 may be implemented using, for example, a GPS receiver and may be configured to generate location information based on encoded GPS signals received from GPS satellites. In general, the SPS receiver 226 may be used by the PPM 104 to collect location information in outdoor environments.

The RF location interface 228 may be implemented using a receiver or a transceiver and may be used to receive location-related signals or information from location information systems such as, for example, the RF transceiver tower 108 and/or the base units 114. The RF location interface 228 may also be configured to broadcast location-related information such as, for example, time-stamped PPM identification codes. The time-stamped PPM identification codes may be received by, for example, three or more of the base units 114, which may process the codes cooperatively using triangulation techniques to determine the location of the PPM 104. The base units 114 may communicate to the home processing system 121 the received time-stamped PPM identification codes along with information relating to the time at which the codes were received by each of the base units 114. The home processing system 121 may then determine the location of the PPM 104 based on this information.

The RF location interface 228 may be implemented using any suitable RF communication device such as, for example, a cellular communication transceiver, a Bluetooth® transceiver, an 802.11 transceiver, an ultrawideband RF transceiver, etc. In addition, the RF location interface 228 may be implemented using only an RF receiver or only an RF transmitter. Examples of known location-based technologies that may be implemented in cooperation with the RF location interface 228 include the Ekahau Positioning Engine™ by Ekahau, Inc. of Saratoga, Calif., an ultrawideband positioning system by Ubisense, Ltd. of Cambridge, United Kingdom, and the Cricket Indoor Location System developed at Massachusetts Institute of Technology ("MIT") of Cambridge, Mass. and described in the technical paper, "The Cricket Indoor Location System", by Nissanka B. Priyantha.

The Ekahau Positioning Engine™ may be configured to work with a plurality of standard wireless communication protocol base stations (e.g., 802.11, Bluetooth®, etc.) to broadcast location-related information. By implementing the RF location interface 228 using a suitable wireless communication protocol device and communicatively coupling the base units 114 to the RF location interface 228 using the same communication protocol, the Ekahau Positioning Engine™ may be used to generate location information. In particular, location-related information may be transmitted from the base units 114, received by the RF location interface 228, and used to generate location information using Ekahau Positioning software offered by Ekahau, Inc.

The Ubisense ultrawideband system may be used by communicatively coupling an ultrawideband transmitter to each of the base units 114 (FIG. 1) and implementing the RF location interface 228 using an ultrawideband receiver. In this manner, the RF location interface 228 can receive ultrawideband signals having location-related information that are broadcast from the base units 114 and the PPM 104 can generate location information based on the received ultrawideband signals.

The Cricket Indoor Location System may be implemented by providing an ultrasound transmitter (e.g., the acoustic signal transmitter 316) to each of the base units 114 (FIG. 1) and an ultrasound receiver (e.g., the acoustic signal sensor 218) to the PPM 104. To determine the location of the PPM 104 within the household 102, the base units 114 can emit an RF signal via the RF location interface 306 and a corresponding ultrasound signal via the acoustic signal transmitter 316. The RF signal includes including a room identifier and/or position coordinates pertaining to the location of the transmitting base unit 114. The PPM 104 can then receive the RF signal via the RF location interface 228 and the ultrasound signal via the acoustic signal sensor 218. The RF signal and the ultrasound signal travel at different propagation speeds and, thus, the PPM 104 will receive the signals at different times. Specifically, the RF signal travels at the speed of light and the ultrasound signal travels at the speed of sound. The PPM 104 can determine the time difference between the reception time of the RF signal and the reception time of the ultrasound signal to determine its distance from the transmitting base unit 114. If the PPM 104 receives signal pairs (e.g., an RF signal and an ultrasound signal) from two or more base units 114, the PPM 104 can use the compare time differences between RF signal receptions and respective ultrasound signal receptions to determine the closest base unit 114. The PPM 104 can then select the room identifier and/or the position coordinates of the signal pairs corresponding to the base unit 114 that is in closest proximity to the PPM 104.

The compass 230 may be implemented using a magnetic field sensor, an electronic compass IC, and/or any other suitable electronic circuit. In general, the compass 230 may be used to generate direction information, which may be useful in determining the direction in which an audience member (e.g., the audience member 106) is facing. The direction information may be used to determine if a person is facing a television to enable consumption of a television program. The direction information may also be used to determine if a person is facing, for example, a billboard advertisement so that when the PPM 104 receives an RF identification signal corresponding to the billboard advertisement and location information indicating that the audience member 106 is in front of the billboard, the direction information from the compass 230 may be used to determine if the audience member 106 is facing the billboard. In this manner, the billboard content may be credited appropriately for being consumed by a person.

An example positioning technology that may be used in combination with the compass 230, the motion sensor 224, and the SPS receiver 226 is the Dead-Reckoning Module (DRM®) produced and sold by Point Research Corporation of Santa Ana, Calif. The DRM® is configured to enable generation and/or collection of location information within buildings (e.g., the household 102) and in outdoor environments. In general, when used outdoors, the DRM® uses GPS technology to collect location information. When used indoors, the DRM® uses, among other components, a compass (e.g., the compass 230) and an accelerometer (e.g., the motion sensor 224) to generate location information.

The plurality of audience alerts 212 may be used to capture the attention of audience members (e.g., the audience member 106 of FIG. 1) to, for example, provide information to audience members and/or request input. Depending on a mode in which the example PPM 104 is operating, the audience member 106 may be prompted via one or more of the audience alerts 212 to indicate via the input interface 214 whether the audience member is consuming the detected media presentation or is merely in the vicinity of the detected media presentation. Additionally, the audience member 106 may be prompted to express approval or disapproval of a media presentation, or may submit his or her approval or disapproval without being prompted. The entry of any input information (whether positive or negative) can also be used to credit a program with active consumption assuming that there is a positive correlation between opinion formulation and consumption (e.g., assuming people tend to formulate opinions on information that has actually been consumed and are less likely to formulate opinions on information to which they have merely been exposed).

The PPM 104 may also include the input interface 214, which may be used by an operator (e.g., the audience member 106) to input information to the PPM 104. For example, the input interface 214 may include one or more buttons or a touchscreen that may be used to enter information, set operational modes, turn the PPM 104 on and off, etc. In addition, the input interface 214 may be used to enter PPM settings information, audience member identification information, etc.

The PPM 104 may further include the visual interface 216, which may be used in combination with the input interface 214 to enter and retrieve information from the PPM 104. For example, the visual interface 216 may be implemented using a liquid crystal display (LCD) that, for example, displays detailed status information, location information, configuration information, calibration information, etc. In some cases, the visual interface 216 may include light-emitting diodes (LEDs) that convey information including, for example, status information, operational mode information, etc.

The timer/counter 217 may be used to generate timer events that are communicated to the processor 202. Timer events may be used to, for example, wake-up the PPM 104 from a shut-down state, powered-down state, a power-saving mode state, etc. The timer/counter 217 may be configured to generate a timing event after a particular amount of time has elapsed or at a particular time of day. The amount of time or time of day may be set by, for example, configuring registers in the timer/counter 217.

Figure 3:
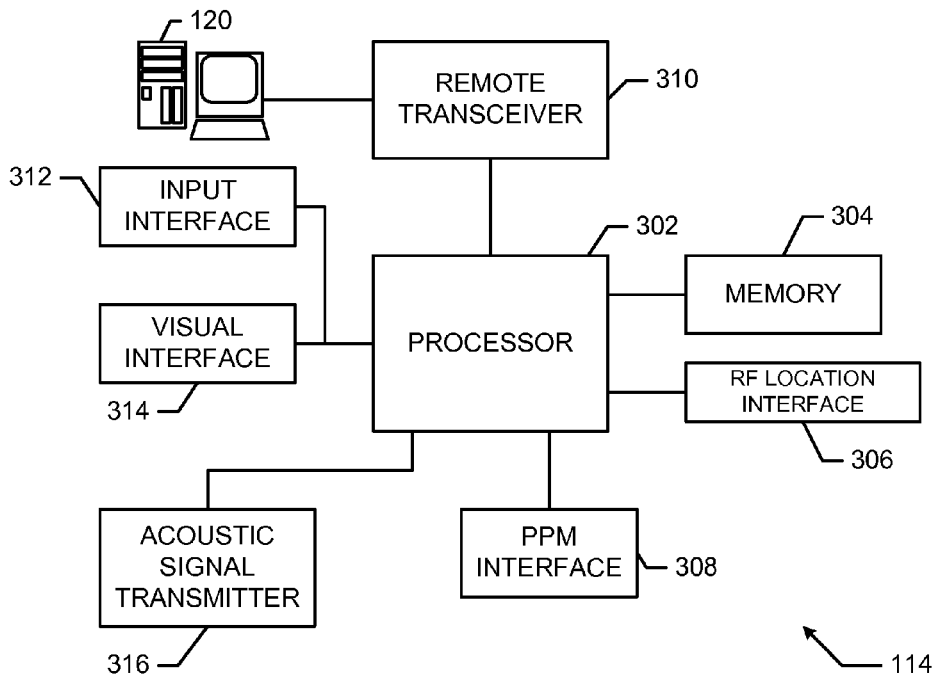
FIG. 3 is a block diagram of an example base unit for use in the system of FIG. 1

FIG. 3 is a block diagram of one of the example base units 114 of FIG. 1. As described above, the example base units 114 may be used to communicate information to the PPM 104, the home processing system 121, and/or the central facility 122 of FIG. 1. As shown in FIG. 3, the example base unit 114 includes a processor 302, a memory 304, an RF location interface 306, a PPM interface 308, a remote transceiver 310, an input interface 312, and a visual interface 314, and an acoustic signal transmitter 316, all of which may be communicatively coupled as shown.

The processor 302 may be used to control and perform various operations or features of the base unit 114 and may be implemented using any suitable processor, including any general purpose processor, digital signal processor, or any combination thereof. For example, the processor 302 may be configured to receive location information, motion information, and/or media monitoring information from the PPM 116. As described above, information collected by the PPM 104 may be stored in the memory 204 (FIG. 2). Alternatively, the collected information may be stored in the memory 304 and communicated to the home processing system 121 and/or the central facility 122.

The processor 302 may also be configured to control communication processes that occur between the base unit 114 and other processing systems (e.g., the PPM 104, the home processing system 121, and the server 126). For example, the processor 302 may provide location-related information to PPMs via the RF location interface 306. In addition, the processor 302 may control the reception of media monitoring information, location information, motion information, etc. from the PPM 104 via the PPM transceiver 308 and store the information in the memory 304. The processor 302 may then cause the remote transceiver 310 to communicate the monitoring data to, for example, the home processing system 121 (FIG. 1) and/or the central facility 126 (FIG. 1) via the remote transceiver 310.

The memory 304 is substantially similar or identical to the memory 204 (FIG. 2) and may be used to store program instructions (e.g., software, firmware, etc.), data (e.g., location information, motion information, media monitoring information, etc.), and/or any other data or information associated with the base unit 114.

The RF location interface 306 may be implemented using a transmitter, a receiver, or a transceiver and configured to transmit and/or receive location-related information and may be configured to communicate with the RF location interface 228 (FIG. 2) of the PPM 104. For example, the RF location interface 306 may transmit location-related codes to the PPM 104, which may receive encoded location-related codes from various base units to determine location coordinates indicative of the location of the PPM 104. Additionally or alternatively, the RF location interface 306 may receive location-related codes from the PPM 104 and, as described above, may work in cooperation with other base units and/or the home processing system 121 to determine the location of the PPM 104.

The RF location interface 306 may be implemented using any suitable RF communication device such as, for example, a cellular communication transceiver, a Bluetooth® transceiver, an 802.11 transceiver, an ultrawideband RF transceiver, etc. In addition, the RF location interface 306 may be used in combination with any of the known location-based technologies described above (e.g., the Ekahau Positioning Engine™ by Ekahau, Inc. and the ultrawideband positioning system by Ubisense, Ltd.). Thus, the RF location interface 306 may be configured to receive and/or transmit any form of location-related information including location coordinates and any other information associated with known location-based technologies.

The PPM interface 308 is substantially similar or identical to the communication interface 206 of FIG. 2 and may be configured to communicate information between the base unit 114 and one or more PPMs (e.g., the PPM 104 of FIGS. 1 and 2). The PPM transceiver 308 may be any wired or wireless transceiver such as, for example, a Bluetooth® transceiver, an 802.11 transceiver, an Ethernet transceiver, a UART, a cellular communication transceiver, etc.

The base unit 114 may also include the input interface 312 and the visual interface 314, which may be substantially similar or identical to the input interface 214 and the visual interface 216, respectively, of FIG. 2.

The acoustic signal transmitter 316 may be configured to emit acoustic signals in the human audible range or non-human audible range (e.g., ultrasound signals). In some example implementations, the acoustic signal transmitter 316 may be used to emit audible alarms or chirps to be detected by the PPM 104 and/or by an audience member. In addition, the acoustic signal transmitter 316 may be configured to output ultrasound signals to be detected by the PPM 104 (e.g., detected by the acoustic signal sensor 218 of FIG. 2) to, for example, generate location information associated with the location of the PPM 104 within a particular environment (e.g., the household 102).

The remote transceiver 310 may be used to communicate information between the base unit 114 and, for example, the home processing system 121 (FIG. 1) and/or the central facility 122 (FIG. 1). The remote transceiver 310 may be communicatively coupled to the network 124 and may be implemented using any suitable wired or wireless communication transceiver including, for example, a telephone modem, a DSL modem, a cable modem, a cellular communication circuit, an Ethernet communication circuit, an 802.11 communication circuit, etc. The remote transceiver 310 may be used to communicate media monitoring information (e.g., audio samples), location information, and/or motion information to the home processing system 121 and/or the central facility 122 via the network 124.

Figure 4:
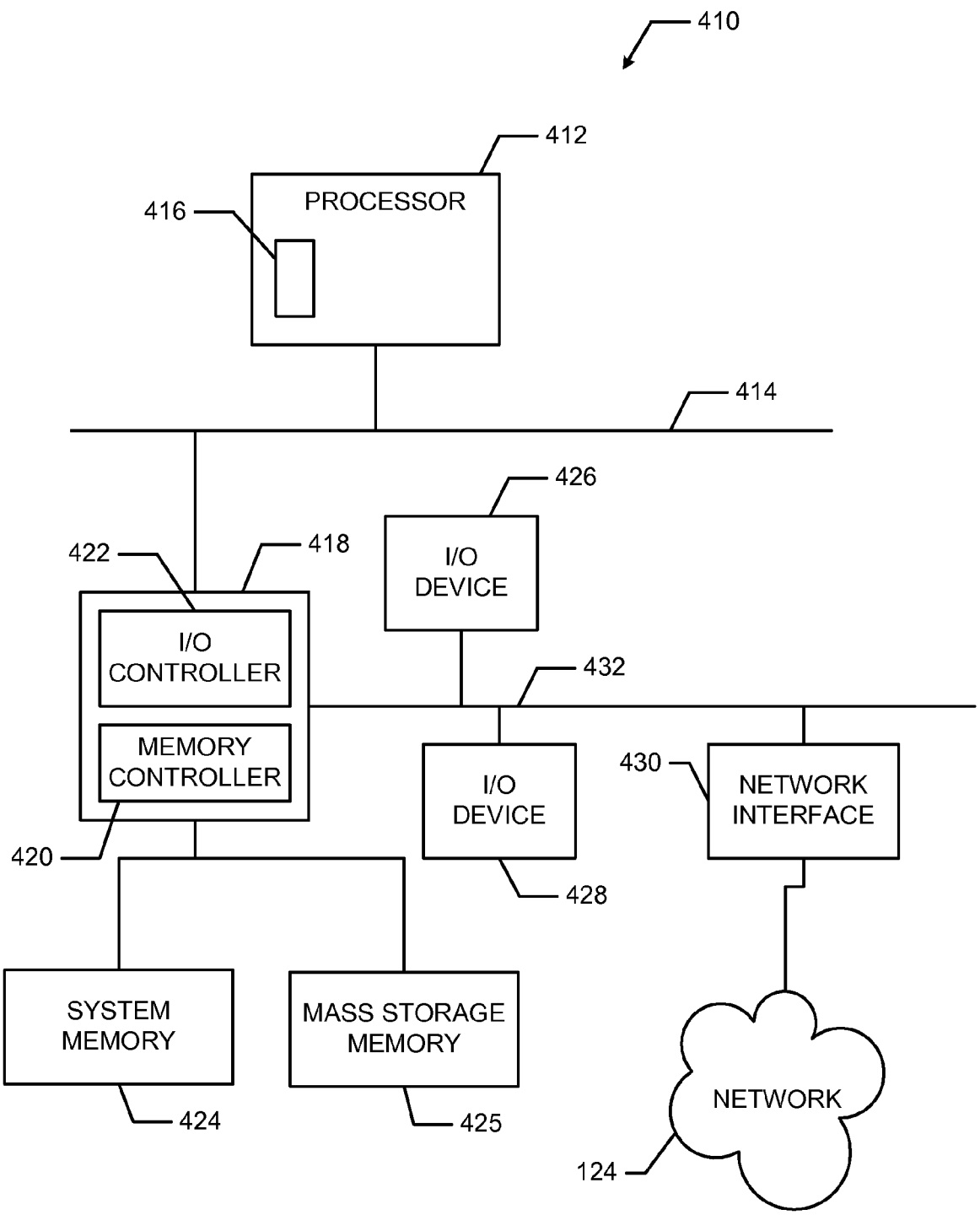
FIG. 4 is a block diagram of an example processor system that may be used to implement portions of the system of FIG. 1.

FIG. 4 is a block diagram of an example processor system 410 that may be used to implement the apparatus and methods described herein. As shown in FIG. 4, the processor system 410 includes a processor 412 that is coupled to an interconnection bus 414. The processor 412 includes a register set or register space 416, which is depicted in FIG. 4 as being entirely on-chip, but which could alternatively be located entirely or partially off-chip and directly coupled to the processor 412 via dedicated electrical connections and/or via the interconnection bus 414. The processor 412 may be any suitable processor, processing unit or microprocessor. Although not shown in FIG. 4, the system 410 may be a multi-processor system and, thus, may include one or more additional processors that are identical or similar to the processor 412 and that are communicatively coupled to the interconnection bus 414.

The processor 412 of FIG. 4 is coupled to a chipset 418, which includes a memory controller 420 and an input/output (I/O) controller 422. As is well known, a chipset typically provides I/O and memory management functions as well as a plurality of general purpose and/or special purpose registers, timers, etc. that are accessible or used by one or more processors coupled to the chipset 418. The memory controller 420 performs functions that enable the processor 412 (or processors if there are multiple processors) to access a system memory 424 and a mass storage memory 425.

The system memory 424 may include any desired type of volatile and/or non-volatile memory such as, for example, static random access memory (SRAM), dynamic random access memory (DRAM), flash memory, read-only memory (ROM), etc. The mass storage memory 425 may include any desired type of mass storage device including hard disk drives, optical drives, tape storage devices, etc.

The I/O controller 422 performs functions that enable the processor 412 to communicate with peripheral input/output (I/O) devices 426 and 428 and a network interface 430 via an I/O bus 432. The I/O devices 426 and 428 may be any desired type of I/O device such as, for example, a keyboard, a video display or monitor, a mouse, etc. The network interface 430 is communicatively coupled to the network 124 and may be, for example, an Ethernet device, an asynchronous transfer mode (ATM) device, an 802.11 device, a DSL modem, a cable modem, a cellular modem, etc. that enables the processor system 410 to communicate with another processor system.

While the memory controller 420 and the I/O controller 422 are depicted in FIG. 4 as separate functional blocks within the chipset 418, the functions performed by these blocks may be integrated within a single semiconductor circuit or may be implemented using two or more separate integrated circuits.

FIGS. 5 through 9 are flow diagrams that depict example methods. The example methods depicted in the flow diagrams of FIGS. 5 through 9 may be implemented in software, hardware, and/or any combination thereof. For example, the example methods may be implemented in software that is executed on the PPM 104 of FIGS. 1 and 2, the base units 114 of FIGS. 1 and 3, and/or the processor system 410 of FIG. 4. Although the example methods are described below as a particular sequence of operations, one or more operations may be rearranged, added, and/or removed to achieve the same or similar results.

Figure 5:
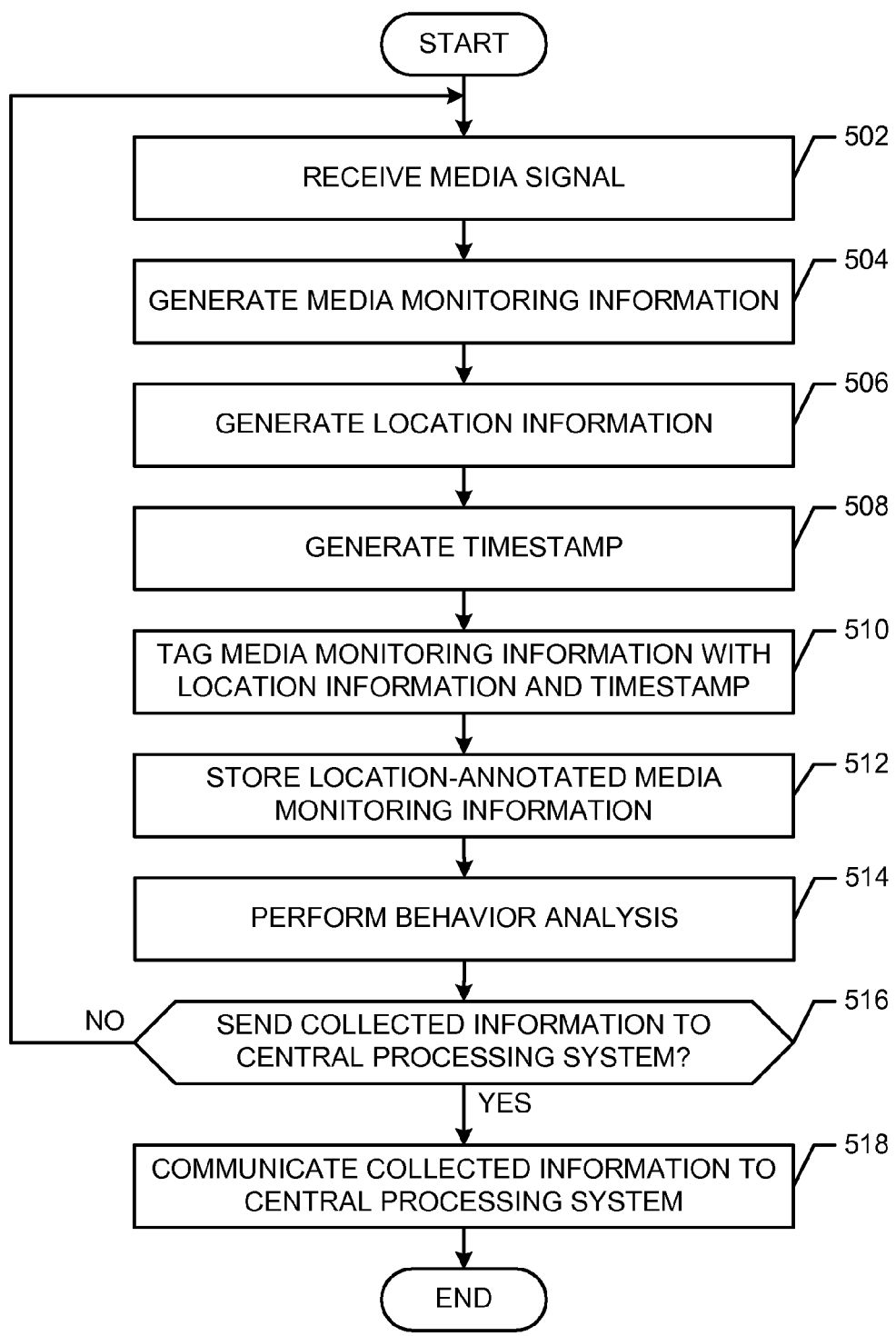
FIG. 5 is a flow diagram of an example method that may be used to collect exposure information and audience member location information.

FIG. 5 is a flow diagram of an example method that may be used to collect and analyze media monitoring information and location information. In particular, the example method of FIG. 5 may be implemented using a PPM (e.g., the PPM 104 of FIG. 1). For example, the PPM 104 may be configured to collect location information, media monitoring information, and perform behavior analysis based on the collected information.

Initially, the PPM 104 receives a media signal (block 502). The media signal may be an audio signal, a video signal, an RF signal, an image, etc. The PPM 104 then generates media monitoring information (block 504) based on the media signal. After the media monitoring information is generated, the PPM 104 generates location information (block 506). The location information may be generated by receiving location data from, for example, a location information system (e.g., the RF transceiver tower 108, the satellite 110, the base units 114 of FIG. 1) and/or a location detection system (e.g., the motion sensor 224 and the compass 230 of FIG. 2 used in combination with the DRM®) and performing a location generation algorithm (e.g., a triangulation algorithm) with the received location data.

The PPM 104 may then generate a timestamp (block 508) associated with the time at which the PPM 104 received the media signal and/or the time at which the PPM 104 received the location data. The media monitoring information may then be tagged with the location information and the timestamp (block 510), after which the location-annotated media monitoring information may be stored (block 512) in, for example, the memory 204 (FIG. 2).

Subsequent behavior analyses may be performed (block 514) by, for example, the PPM 104 based on the location-annotated media monitoring information. An example method that may be used to perform behavior analysis is described in greater detail below in connection with FIG. 6.

The PPM 104 may then determine if the collected information (e.g., the location-annotated media monitoring information) should be sent or communicated to a central processing system (e.g., the home processing system 121 or the server 126 of FIG. 1). For example, the PPM 104 may be configured to communicate the stored information based on predetermined time intervals (e.g., periodically) or based on a predetermined number of stored entries. If the stored information is not to be communicated to the central processing system, control is passed back to block 502. Otherwise, the collected information is communicated to the central processing system (block 518), after which the process may be ended.

Although not shown, following the operation of block 518, control may be passed back to block 502.

Figure 6:
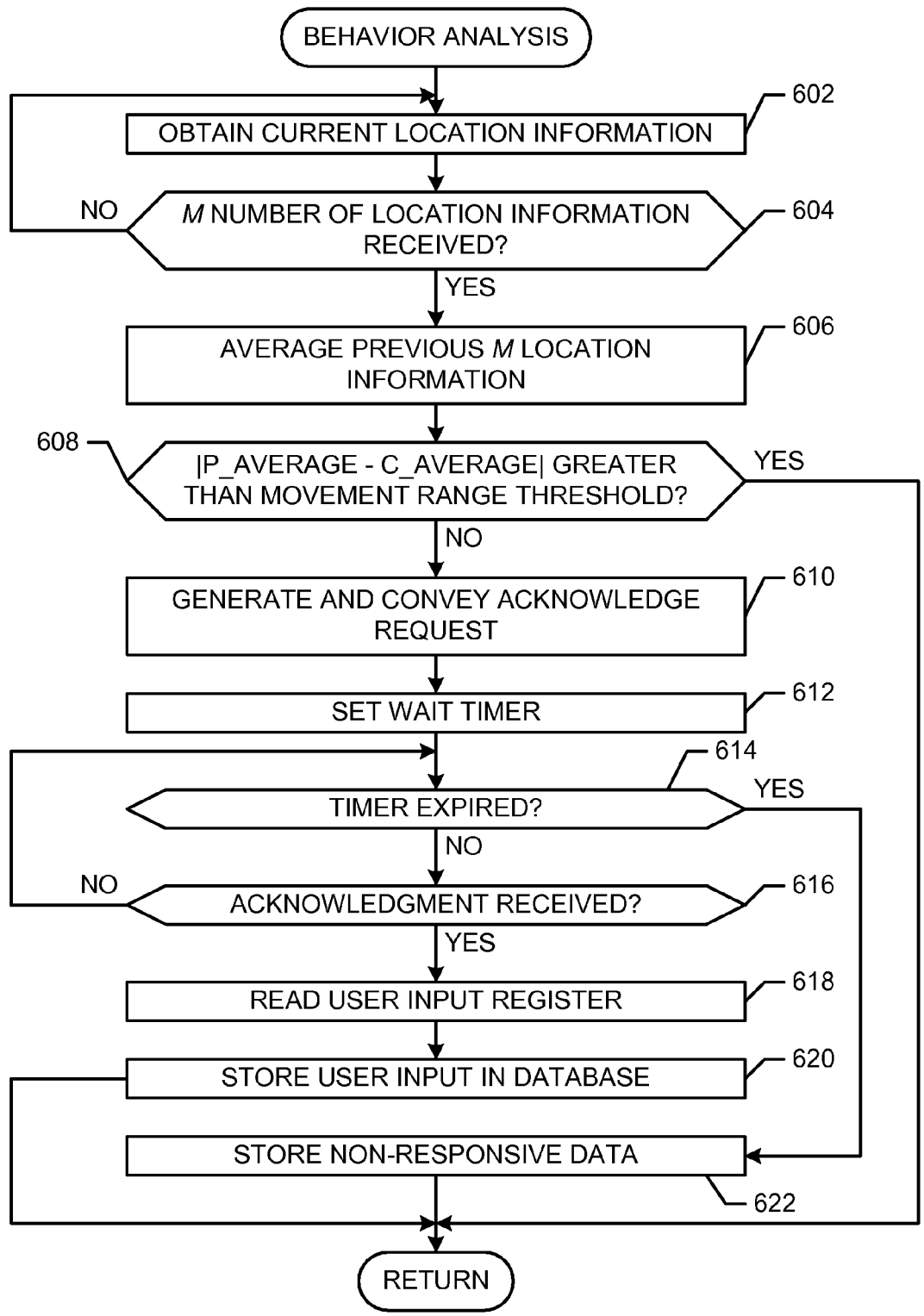
FIG. 6 is a flow diagram of an example method that may be used to collect and analyze audience member location information and audience member motion information to monitor audience member behaviors.
Figure 7:
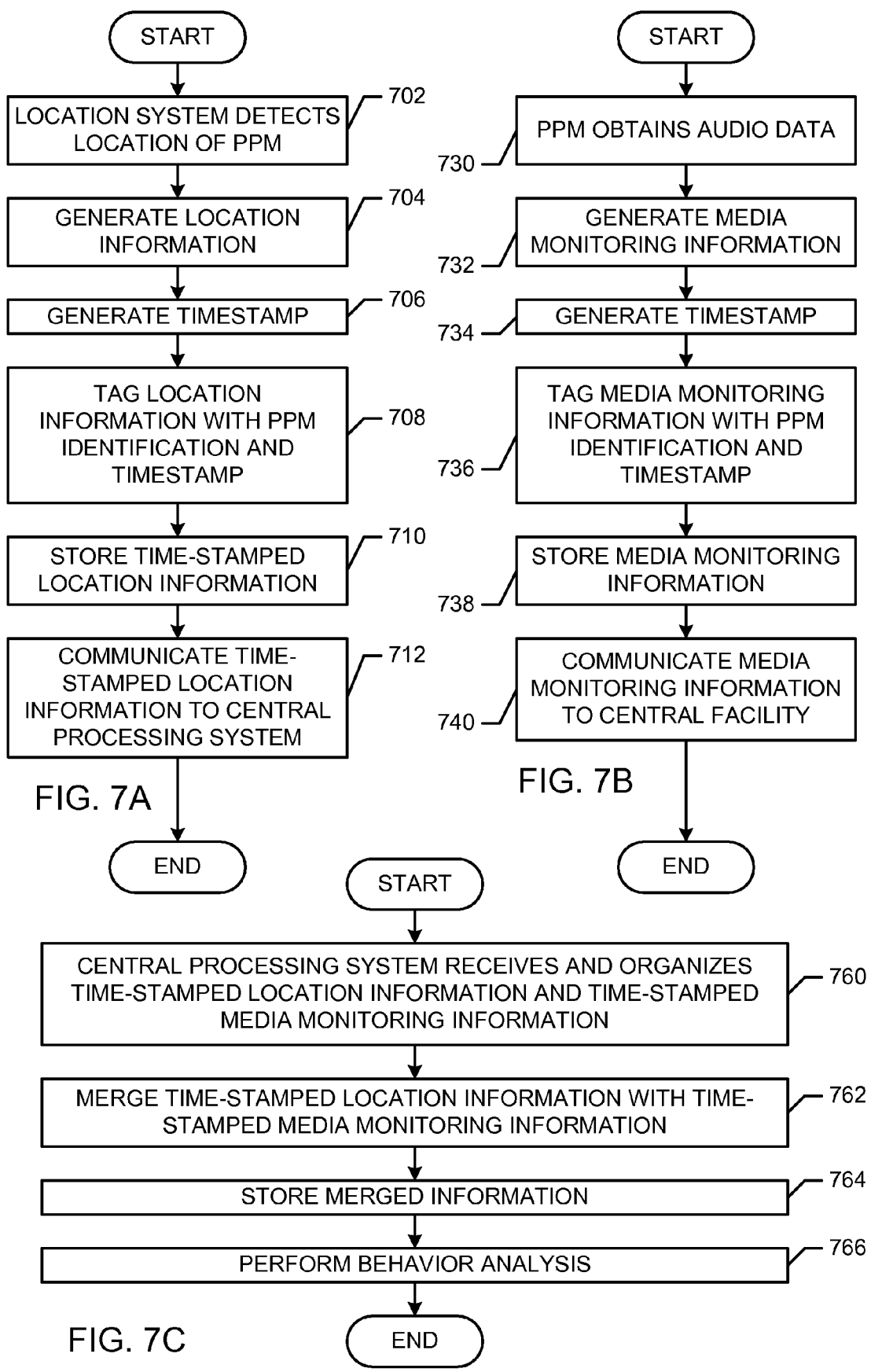
FIGS. 7A, 7B, and 7C are flow diagrams of an example method that may be used to collect and analyze media exposure information and audience member location information.

FIG. 6 is a flow diagram of an example method that may be used to analyze audience member location information and motion information to monitor audience member behaviors. The example method may be used to implement the behavior analysis operation of block 514 of FIG. 5. In general, the example method of FIG. 6 may be used to determine the attentiveness of an audience member to media presentations and to prompt audience members (e.g., the audience member 106) when an inattentive behavior is detected. The example method of FIG. 6 may be performed by any suitable processing system such as, for example, the PPM 104, the home processing system 121, or the server 126.

Initially, location information is obtained (block 602) and it is determined if a predetermined number (M) of location information entries have been received (block 604). If M location information entries have not been received, control is passed back to block 602. Otherwise, the previous M locations are averaged (block 606) to generate a current average location information entry (C_average).

The current average location information entry is then subtracted from a previous average location information entry to determine if the difference in location defines a range of movement that is greater than a movement range threshold (block 608). The previous average location information entry may be generated from a previous number of M location information entries in, for example, a previous iteration of blocks 602 through 606. The movement range threshold may be defined as a range of movement that indicates whether a person is active. For example, if the location of a person does not change to indicate a range of movement greater than the movement range threshold, then it may be determined that the person is inactive.

If it is determined at block 608 that the absolute difference between the current average location entry and the previous average location entry is greater than the movement range threshold, then control may be returned to a process (e.g., the example method of FIG. 5) that called or invoked the example method of FIG. 6. However, if it is determined at block 608 that the absolute difference between the current average location entry and the previous average location entry is not greater than the movement range threshold, an acknowledge request may be generated and conveyed (block 610). The acknowledge request may be used to verify if an audience member (e.g., the audience member 106 of FIG. 1) is attentive to a media presentation. If the example method of FIG. 6 is performed by the PPM 104, the acknowledge request may be generated by the PPM 104 and displayed to a user via, for example, one of the plurality of audience alerts 212. If the example method of FIG. 6 is performed in real time by a processing system other than the PPM 104, the acknowledge request may be communicated to the PPM 104 via any data transmission means so that the PPM 104 may prompt the user (e.g., the audience member 106).

A wait timer (e.g., the timer/counter 217 of FIG. 2) is then set (block 612). The wait timer may be set to a predetermined duration of time within which the audience member 106 is given an opportunity to respond. It is then determined if the wait timer is expired (block 614). If the wait timer is not expired, it is determined if an acknowledgement has been received (block 616). The audience member 106 may provide an acknowledgement via, for example, the input interface 214 (FIG. 2). The acknowledgement may be received into or stored in a user input register or any other memory location that may be monitored to determine when the acknowledgement is received.

If it is determined that the acknowledgement has not been received, control is passed back to block 614. Otherwise, the user input register in which the acknowledgement is stored may be read (block 618). The user input (e.g., the acknowledgement) may then be stored (block 620) in a memory (e.g., the memory 204 of FIG. 2).

If it is determined at block 614 that the wait timer is expired, control is passed to block 622 and non-responsive data is stored to indicate that no acknowledgement was provided by the audience member 106. The acknowledge data and/or the non-responsive data stored in connection with blocks 620 and 622, respectively, may be stored with corresponding location-annotated media monitoring information that was stored in connection with the operation of block 512 described above in connection with FIG. 5.

FIGS. 7A, 7B, and 7C are flow diagrams of another example method that may be used to collect and analyze media monitoring information and location information. The example methods of FIGS. 7A-7C may be implemented using a PPM (e.g., the PPM 104 of FIGS. 1 and 2), a location information system (e.g., one or more of the base units 114, the RF transceiver tower 108, and/or the satellite 110 of FIG. 1), and a central processing system (e.g., the home processing system 121 or the server 126 of FIG. 1). In general, the example methods of FIGS. 7A-7C are used to obtain and store in the location information system the location information associated with the location of the PPM 104, obtain and store media monitoring information in the PPM 104, and merge the location information and the media monitoring information in a central processing system.

FIG. 7A is a flow diagram of an example method that may be implemented using the base unit 114 to obtain location information about the location of the PPM 104. For example, the base unit 114 may be configured to generate location information based on the proximity of the PPM 104 to the base unit 114 and/or the location of the PPM 104 relative to the base unit 114 or some other point of reference (e.g., a coordinate grid). The example method of FIG. 7A may also be implemented using an identification tag (e.g., the example identification tag 1600 of FIG. 16). In this case the base units 114 may be configured to generate location information based on the proximity of the identification tag 1600 to the base unit 114 and/or the location of the identification tag 1600 relative to the base unit 114 or some other point of reference.

For purposes of clarity the example method of FIG. 7A is described based on location of the PPM 104. However, the operations of the example method may be modified to use proximity of the PPM 104 or the identification tag 1600 instead of or in combination with location of the PPM 104 to generate the location information. Initially, the location information system detects the location of the PPM 104 and/or receives location data (e.g., location coordinates) from the PPM 104 (block 702). Location information may then be generated (block 704) based on the detected location of the PPM 104 or the location data. A timestamp is then generated (block 706) based on the time at which the location data was received or the time at which the location of the PPM 104 was detected.

The location information is then tagged with the timestamp and PPM identification information to generate time-stamped location information (block 708). The PPM identification information may be received from a PPM (e.g., the PPM 104 of FIGS. 1 and 2) via, for example, RF communications. The time-stamped location information is then stored (block 710) in, for example, the memory 302 (FIG. 3). The time-stamped location information may then be communicated to a central processing system (e.g., the home processing system 121 or the server 126 of FIG. 1) (block 712). The time-stamped location information may be communicated to the central processing system at predetermined times or may be communicated after a predetermined number of time-stamped location information entries have been stored.

FIG. 7B is a flow diagram of an example method that may be implemented using a PPM (e.g., the PPM 104 of FIGS. 1 and 2) and used to obtain and store media monitoring information. Initially, the PPM 104 obtains audio data (block 730) and generates media monitoring information (block 732) based on the audio data. The PPM 104 may then generate a timestamp (block 734) based on the time at which the PPM 104 obtained the audio data.

The PPM 104 may then tag the media monitoring information with the timestamp and PPM identification information (block 736) to generate time-stamped media monitoring information. The time-stamped media monitoring information is then stored (block 738) in, for example, the memory 202 (FIG. 2).

The PPM 104 may then communicate the stored time-stamped media monitoring information to a central processing system (e.g., the home processing system 121 or the server 126 of FIG. 1) (block 740). The time-stamped location information may be communicated to the central processing system at predetermined times or may be communicated after a predetermined number of time-stamped location information entries have been stored.

FIG. 7C is a flow diagram of an example method that may be used to merge the time-stamped location information and the time-stamped media monitoring information collected in connection with the example methods of FIGS. 7A and 7B. In addition, the example method of FIG. 7C may be used to perform a behavior analysis on the merged information. The example method may be implemented using a central processing system such as, for example, the home processing system 121 or the server 126 of FIG. 1.

Initially, the central processing system receives and organizes the time-stamped location information and the time-stamped media monitoring information (block 760). The central processing system may receive time-stamped location information and a plurality of time-stamped media monitoring information from various PPMs, in which case the central processing system may organize the received information based on the PPM identification codes embedded therein so that subsequent merging of the information will merge time-stamped location information with time-stamped media monitoring information associated with the same PPM.

After the information is organized, the central processing system may merge the time-stamped location information with the time-stamped media monitoring information (block 762). The merged information may then be stored (block 764) in, for example, the mass storage memory 425 of FIG. 4.

The central processing system may then perform a behavior analysis on the merged information (block 766). For example, the central processing system may perform a behavior analysis substantially similar or identical to the example method of FIG. 6.

Figure 8:
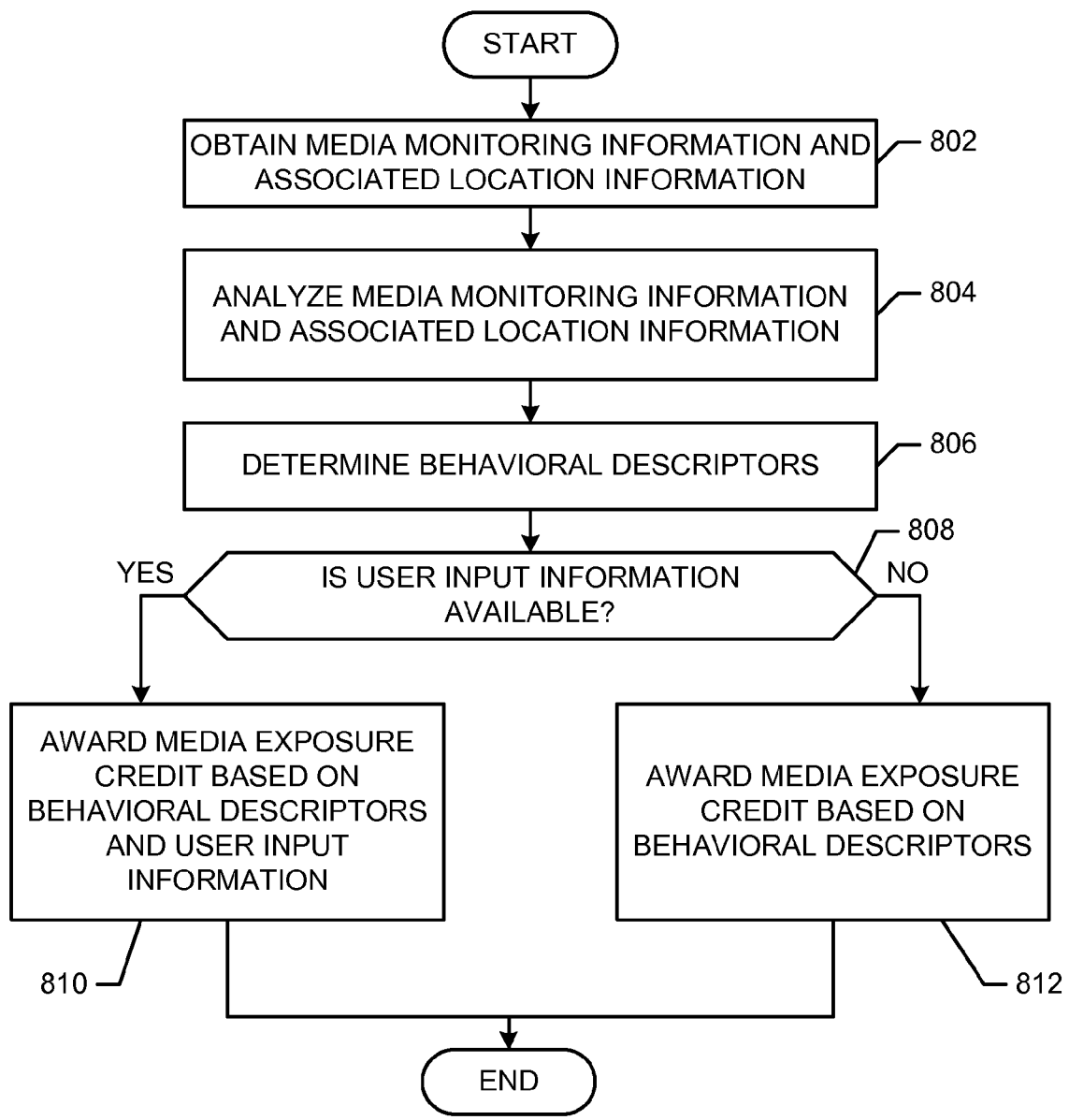
FIG. 8 is a flow diagram of an example method that may be used to credit a media presentation as being consumed based on exposure information and audience member behavior information.

FIG. 8 is a flow diagram of an example method that may be used to determine distribution of credits based on media monitoring information and audience member behavior. In general, the example method of FIG. 8 may be used to tag media monitoring information with behavioral descriptors that indicate the level of attentiveness of an audience member when consuming or exposed to a media presentation. The example method of FIG. 8 may be implemented as a real-time process or as a post process by any processing system such as, for example, the PPM 104, the home processing system 121, or the server 126 of FIG. 1.

Initially, the processing system obtains media monitoring information and associated location information (block 802). The media monitoring information and the associated location information may then be analyzed (block 804), after which one or more behavioral descriptors are determined (block 806) based on the analysis performed at block 804. The behavioral descriptors may be associated with various levels of attentiveness such as, for example, inattentive behavior, attentive behavior, passive consuming, active participant, etc.

It is then determined whether user input information is available (block 808) for the media monitoring information and associated location information. For example, the user input information may be the acknowledgement information described above in connection with the example method of FIG. 6. If user input information is available, credit is awarded to a particular media presentation based on the behavioral descriptors and the user input information (block 810). For example, if the behavioral descriptors indicate that an audience member was not attentive due to a lack of movement, the user input information may be acknowledgement information provided by the user indicating that the user was actually consuming a media presentation while sitting still for an extended period of time. If user input information is not available, media exposure credit is awarded to a media presentation based on the behavioral descriptors (block 812).

Figure 9A:
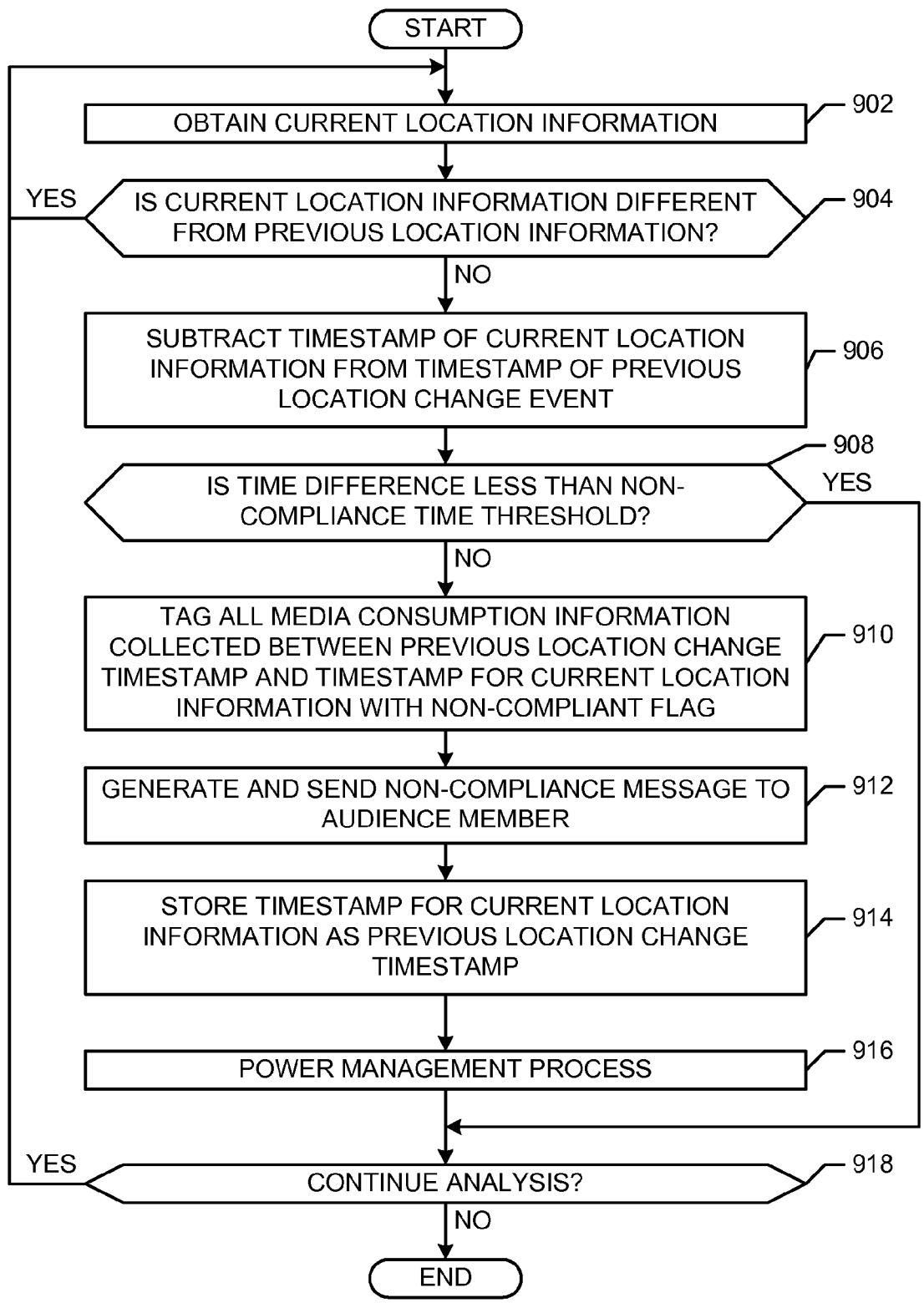
FIG. 9A is a flow diagram of an example method that may be used to determine an audience member's compliance with PPM carrying/wearing requirements.

FIG. 9A is a flow diagram of an example method that may be used to determine compliance of an audience member's usage of a PPM (e.g., the PPM 104 of FIG. 1). The example method of FIG. 9A may be performed as a real-time process or as a post process by any suitable processing system such as, for example, the PPM 104, the home processing system 121, the base units 114, or the server 126 of FIG. 1. In general, the example method may be used to identify macro movements of the PPM 104 to determine if the PPM 104 is being worn or carried in a manner that complies with usage requirements or guidelines.

Initially, current location information is obtained (block 902). It is then determined whether the current location information is different from the previous location information (block 904). If the current location information is different from the previous location information, control is passed back to block 902. However, if the current location information is not different from the previous location information, the timestamp of the current location information is subtracted from the timestamp of the previous location change event (block 906). The previous location change event is the event at which two previous location information entries differed from one another, which indicates that the PPM 104 was moved.

It is then determined whether the time difference between the current location information and the previous location change event is less than a non-compliance threshold (block 908). The non-compliance threshold may be a predetermined period of time within which the PPM 104 must be moved to indicate that the PPM 104 is being used according to usage requirements or guidelines. If it is determined at block 908 that the time difference between the current location information and the previous location change event is not less than a non-compliance threshold, all of the media consumption information collected between the timestamp of the previous location change event and the timestamp of the current location information is logged with non-compliance flags or indicators (block 910). The non-compliance flags may be used during subsequent analyses to ignore or disregard any media monitoring information collected during the time that an audience member was inattentive. A non-compliance message is then generated and sent to the audience member (block 912). The non-compliance message may be sent to the audience member via, for example, the visual interface 216 (FIG. 2) of the PPM 104, a telephone call, mail, email, etc. The timestamp for the current location information is then stored as the timestamp for the previous location change event (block 914).

To reduce power consumption when the usage of a PPM is out of compliance, a power management process may then be performed (block 916). The power management process may involve implementing one or more operations that, for example, configure the PPM 104 to operate in a power-saving mode. In this manner, battery life of the PPM 104 may be extended by not consuming unnecessary power. An example method that may be used to implement the power management process of block 916 is described in greater detail below in connection with FIG. 9C.

If the time difference between the previous location change event and the current location information is less than a non-compliance threshold or after the operation of block 916, it is determined whether the non-compliance analysis should continue (block 918). If the non-compliance analysis should continue, control is passed to block 902. Otherwise, the example method is ended.

Figure 9B:
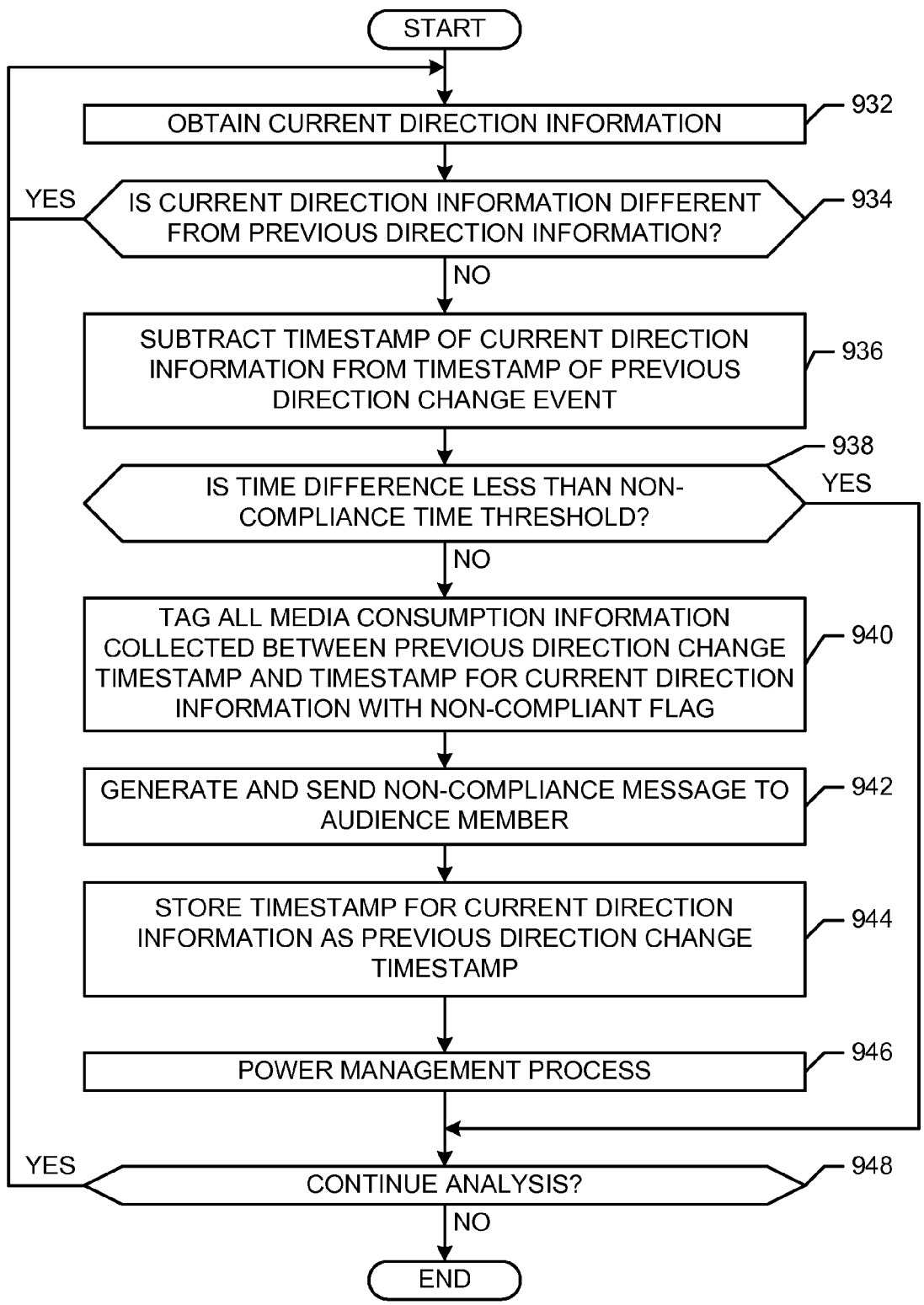
FIG. 9B is a flow diagram of another example method that may be used to determine an audience member's compliance with PPM carrying/wearing requirements.

FIG. 9B is a flow diagram of another example method that may be used to determine an audience member's compliance with PPM carrying/wearing requirements. The example method of FIG. 9B may be performed as a real-time process or as a post process by any suitable processing system such as, for example, the PPM 104, the home processing system 121, the base units 114, or the server 126 of FIG. 1. In general, the example method may be used to identify changes in the direction in which the PPM 104 is positioned to determine if the PPM 104 is being worn or carried in a manner that complies with usage requirements or guidelines. An example implementation of the example method of FIG. 9B may involve using direction information generated by the compass 230 (FIG. 2).

Initially, current direction information is obtained (block 932). It is then determined whether the current direction information is different from the previous direction information (block 934). If the current direction information is different from the previous direction information, control is passed back to block 932. However, if the current direction information is not different from the previous direction information, the timestamp of the current direction information is subtracted from the timestamp of the previous direction change event (block 936). The previous direction change event is the event at which two previous direction information entries differed from one another, which indicates that the PPM 104 was moved.

It is then determined whether the time difference between the current direction information and the previous direction change event is less than a non-compliance threshold (block 938). The non-compliance threshold may be a predetermined period of time within which the PPM 104 must be moved to indicate that the PPM 104 is being used according to usage requirements or guidelines. If it is determined at block 903 that the time difference between the current direction information and the previous direction change event is not less than a non-compliance threshold, all of the media consumption information collected between the timestamp of the previous direction change event and the timestamp of the current direction information is logged with non-compliance flags or indicators (block 940). The non-compliance flags may be used during subsequent analyses to ignore or disregard any media monitoring information collected during the time that an audience member was inattentive. A non-compliance message is then generated and sent to the audience member (block 942). The non-compliance message may be sent to the audience member via, for example, the visual interface 216 (FIG. 2) of the PPM 104, a telephone call, mail, email, etc. The timestamp for the current direction information is then stored as the timestamp for the previous direction change event (block 944).

To reduce power consumption when the usage of a PPM is out of compliance, a power management process may then be performed (block 946). The power management process may involve implementing one or more operations that, for example, configure the PPM 104 to operate in a power-saving mode. In this manner, battery life of the PPM 104 may be extended by not consuming unnecessary power. An example method that may be used to implement the power management process of block 946 is described in greater detail below in connection with FIG. 9C.

After the operation of block 946 or if it is determined at block 938 that the time difference between the previous direction change event and the current direction information is less than a non-compliance threshold, it is then determined whether the non-compliance analysis should continue (block 948). If the non-compliance analysis should continue, control is passed to block 932. Otherwise, the example method is ended.

Figure 9C:
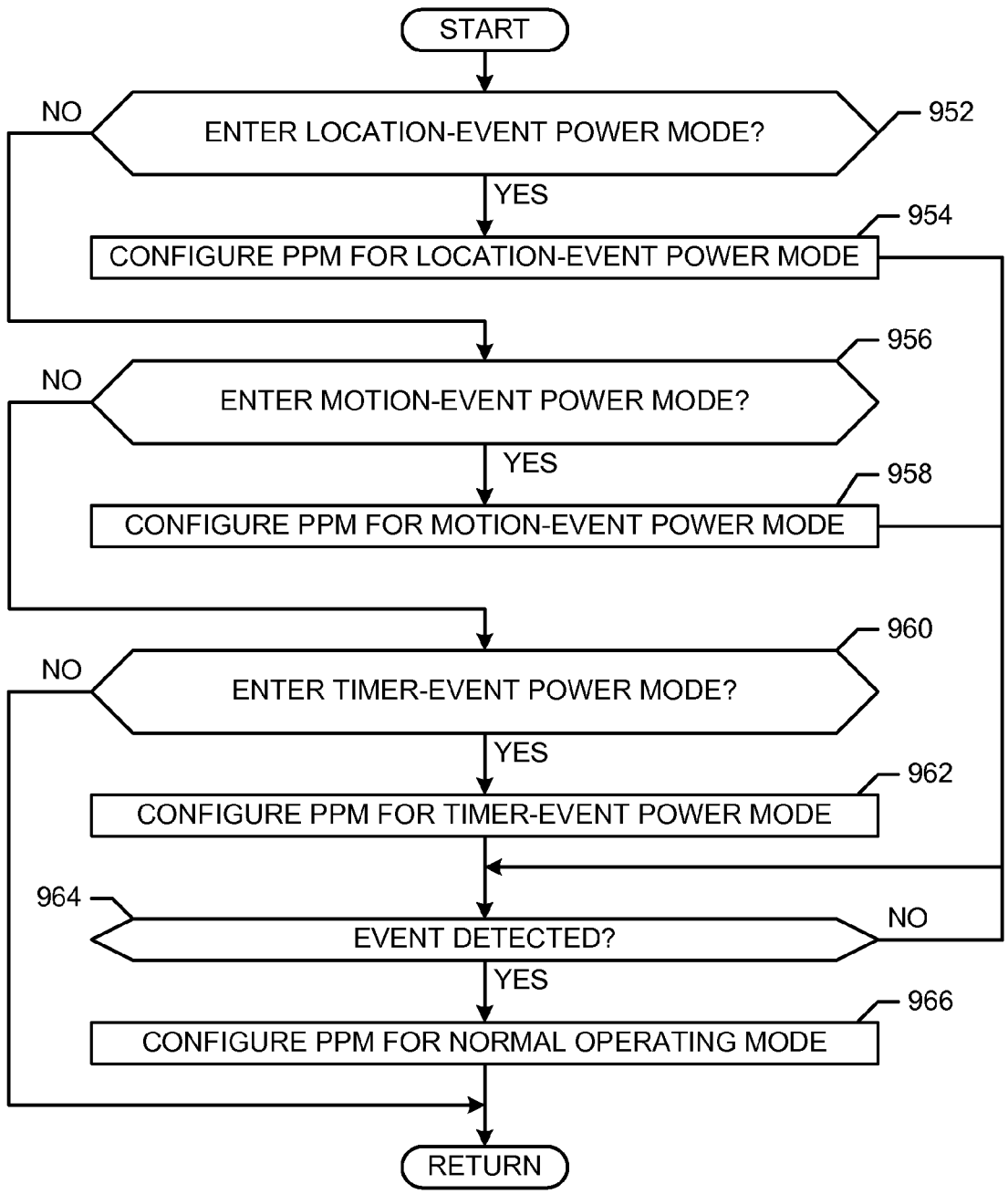
FIG. 9C is a flow diagram of an example method that may be used to implement one or more power management processes in connection with the example methods of FIGS. 9A and 9B.

FIG. 9C is a flow diagram of an example method that may be used to implement one or more power management processes in connection with the example methods of FIGS. 9A and 9C. More specifically, the example method of FIG. 9C may be used to implement the power management process operations of block 916 (FIG. 9A) and block 946 (FIG. 9B). The power management process may be used to configure a PPM (e.g., the PPM 104 of FIG. 1) to operate in one or more power-saving modes. A power-saving mode may be selected based on various criteria such as, for example, the amount of time a PPM is non-compliant, the amount of battery life in the battery of the PPM, a desired power consumption, etc. As described below the PPM 104 may be configured to operate in a receive-event power mode, a motion-event power mode, or a timer-event power mode. Of course, the power management process may be used to implement any other suitable power-saving mode for a PPM. The PPM 104 may use configuration settings such as software flags to determine the type of power-saving mode for which it should be configured or in which it should operate.

The example method of FIG. 9C may be used to shut down, remove power from, or otherwise cause one or more portions (e.g., media monitoring detection algorithms, circuitry, etc.) of the PPM 104 to operate in or enter a power-saving mode if it is determined that the PPM 104 is not being carried/worn and/or that the audience member 106 (FIG. 1) is otherwise in a non-compliant state with respect to PPM usage requirements. The portions of the PPM 104 may remain in the power-saving mode until one or more events occur that indicate that the PPM 104 is again being worn/carried or otherwise indicate that the audience member is complying with the PPM usage requirements. The PPM 104 may be configured to determine if it should operate in a power-saving mode and the type of power-saving mode in which it should operate based on predetermined rules or criteria that may be stored in a memory (e.g., the memory 204 of FIG. 2) or in register locations. Example rules or criteria may be based on an amount of time for which PPM usage has been out of compliance, an amount of remaining battery life, the quantity of media monitoring information that is being received, etc.

Now turning in detail to FIG. 9C, the PPM 104 determines if it should operate in a location-event power mode (block 952). If the PPM 104 determines that it should operate in the location-event power mode, the PPM 104 may configure its hardware and/or software to operate in the location-event power mode (block 954). For example, the PPM 104 may disable the media monitoring detection algorithm and/or remove power from (i.e., powering down) one or more portions of circuitry associated with detecting media monitoring information such as, for example, the media monitoring information sensors 208 (FIG. 2) and any portion (e.g., sensor interface ports, memory, processing cores, etc.) of the processor 202 (FIG. 2) associated with detecting media monitoring information. Alternatively, the one or more portions of circuitry may be configured to operate in a relatively low power consumption mode such as a hibernate mode, a standby mode, a sleep mode, etc. Additionally, the PPM 104 may also configure other circuitry and software to detect when a particular type of event is received. For example, the PPM 104 may configure one or more of the plurality of location and motion sensors 210 (FIG. 2), the processor 202, and associated location detection algorithms to generate a location change event when the PPM 104 is moved. The PPM 104 may further configure the processor 202 to restore power to any circuitry associated with detecting media monitoring information and to enable the media monitoring information algorithm in response to detecting the location event.

If the PPM 104 determines at block 952 that it should not operate in the location-event power mode, the PPM 104 determines whether it should operate in a motion-event power mode (block 956). The motion-event power mode may be used to configure portions of the PPM 104 to operate in a low-power mode and/or to remove power from portions of the PPM 104 until a motion event is generated and/or detected. The motion event may be generated and/or detected when the PPM 104 is moved by, for example, the audience member 106 (FIG. 1).

If the PPM 104 determines at block 956 that it should operate in the motion-event power mode, the PPM 104 may configure its hardware and/or software to operate in the motion-event power mode (block 958). For example, the PPM 104 may disable the media monitoring detection algorithm and/or remove power from (i.e., powering down) one or more portions of circuitry associated with detecting media monitoring information as described above in connection with block 954. The PPM 104 may also remove power from its location sensors (e.g., the SPSR 226 and the RF location interface 228 of FIG. 2) or configure its location sensors to operate in a low-power mode. Additionally, the PPM 104 may configure one or more of the motion sensor 224, the compass 230, and the processor 202 of FIG. 2 to generate and/or detect a motion event or a direction change event when the PPM 104 is moved. The PPM 104 may further configure the processor 202 to restore power to any circuitry associated with detecting media monitoring information and to enable the media monitoring information algorithm in response to detecting the motion event or direction change event.

If the PPM 104 determines at block 956 that it should not operate in the motion-event power mode, the PPM 104 determines whether it should operate in a timer-event power mode (block 960). The timer-event power mode may be used to configure portions of the PPM 104 to operate in a low-power mode and/or to remove power from portions of the PPM 104 until a timer event is generated and/or detected. The timer event may be generated by a timer or counter (e.g., the timer/counter 217 of FIG. 2) that is configured to generate interrupts or events after a predetermined amount of time has elapsed.

If the PPM 104 determines at block 960 that it should operate in the timer-event power mode, the PPM 104 may configure its hardware and/or software to operate in the timer-event power mode (block 962). For example, the PPM 104 may disable the media monitoring and detection algorithm and/or remove power from (i.e., powering down) one or more portions of circuitry associated with detecting media monitoring information as described above in connection with block 954. The PPM 104 may also remove power from any other circuitry except the timer/counter 217 or configure the circuitry to operate in a low-power mode. The PPM 104 may then configure the timer/counter 217 to generate a timer event and configure the processor 202 to detect the timer event. The PPM 104 may further configure the processor 202 and/or software to restore power to any circuitry that was previously powered down and to enable the media monitoring information algorithm in response to detecting the timer event.

If the PPM 104 determines at block 960 that it should not operate in the timer-event power mode, control may be returned to a previous process (e.g., the example method of FIG. 9A) from which the process or example method of FIG. 9C was called or invoked. If the PPM 104 is configured at any of the blocks 954, 958, and 962 to operate in any of the power modes described above, the PPM 104 monitors for the occurrence of an event (e.g., operates in an event monitoring mode) and determines if an event (e.g., a location event, a motion event, a timer event) is detected (block 964). If an event is not detected, the PPM 104 may continue monitoring (e.g., continue operating in the event monitoring mode). If the PPM 104 detects an event at block 964, the PPM 104 may configure its circuitry and/or software to operate in a normal operating mode (block 960). For example, the PPM 104 may restore power to any circuitry that was previously powered down or previously configured to operate in a low-power mode. The PPM 104 may also enable any software or algorithms (e.g., the media monitoring and detection algorithm) that were previously disabled. Control may then be passed back to the process that called the process or example method of FIG. 9C. Alternatively, control may be passed to a subsequent process.

In one example, the PPM 104 may reactivate or restore a normal operating mode to only limited resources (e.g., circuitry, software, algorithms, etc.) for an amount of time sufficient to determine whether the audience member is in compliance with PPM usage requirements. If compliance is detected, then the PPM 104 may reactivate all media monitoring, location detection, and motion detection circuitry. If compliance is not detected, the PPM 104 may again return to a power-saving mode for the predefined amount of time until an event (e.g., a location event, a motion event, a timer event) is detected, at which point the PPM 104 will repeat the activation and compliance detection operations. The PPM 104 may remain in a power saving mode until compliance is detected or until battery life expires.

Figure 10:
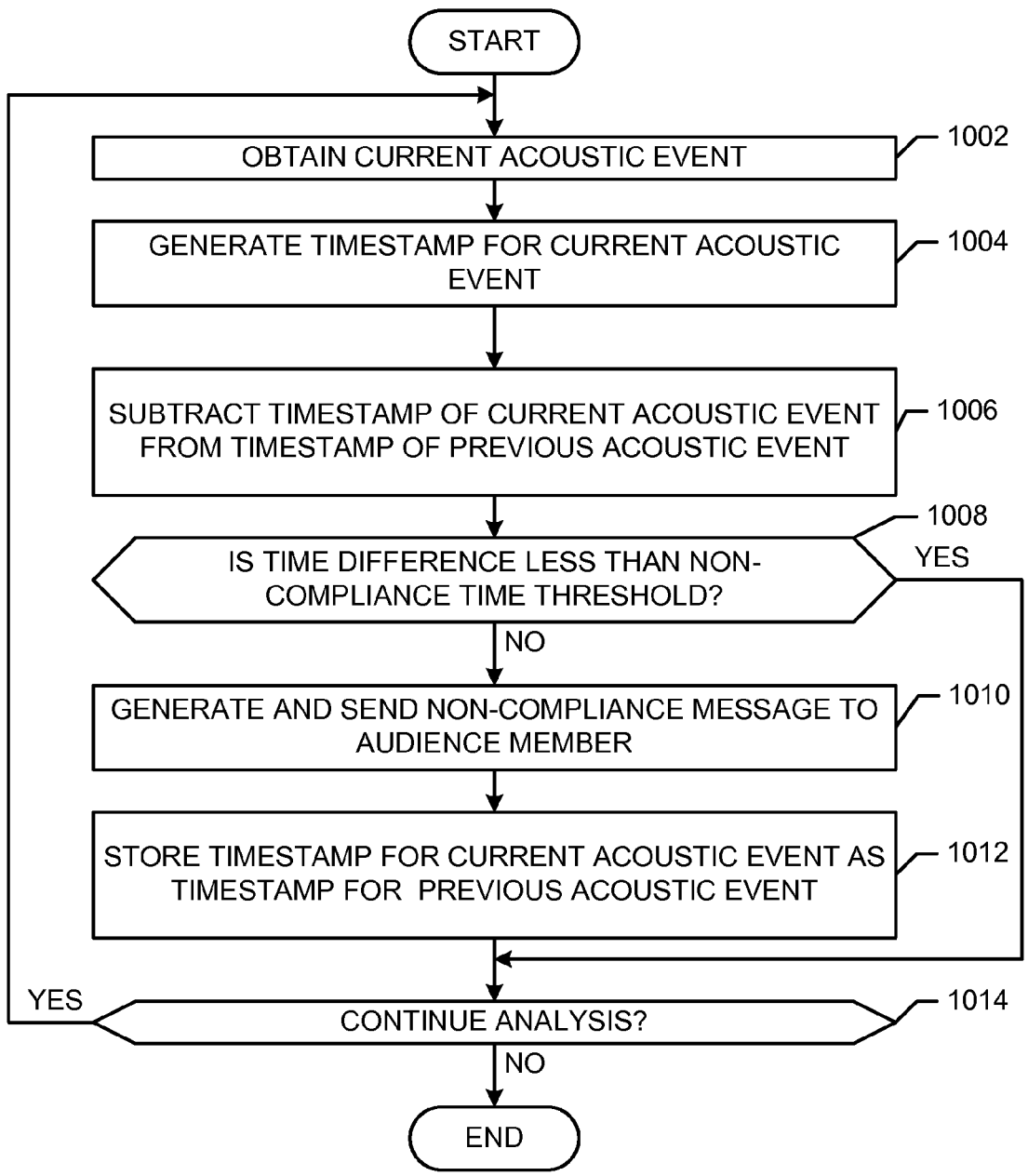
FIG. 10 is a flow diagram of another example method that may be used to determine an audience member's compliance with PPM carrying/wearing requirements.

FIG. 10 is a flow diagram of another example method that may be used to determine an audience member's (e.g., the audience member 106 of FIG. 1) compliance with PPM usage requirements (e.g., the PPM 104 of FIGS. 1 and 2). The example method of FIG. 10 may be performed as a real-time process or as a post process using any suitable processing system such as, for example, the PPM 104, the home processing system 121, the base units 114, or the server 126 of FIG. 1. In particular, the example method may be used to determine and analyze periods of time between detected acoustic events to determine whether the PPM 104 is being used in a manner that complies with wearing/carrying (usage) requirements or guidelines. Generally, acoustic events may be an acoustic or audio emission that is produced by any person or anything within audible range of the PPM 104. For example, an acoustic event may be a scraping sound (e.g., pants scraping on couch), wind, speech, media audio (e.g., television audio, stereo audio, or any other audio associated with a media presentation), tapping, knocking, etc.

Initially, a current acoustic event is obtained (block 1002). An acoustic event may be obtained by the PPM 104 via, for example, the acoustic signal sensor 218 (FIG. 2). For example, obtaining a current acoustic event may involve detecting audio or sound via the acoustic signal sensor 218 that is emitted into a room or space. A timestamp is then generated for the current acoustic event (block 1004). The timestamp may be generated to indicate the time at which the acoustic event was obtained or detected in connection with block 1002.

The timestamp of the current acoustic event is then subtracted from the timestamp of a previous acoustic event (block 1006). The previous acoustic event is an acoustic event that was obtained or detected by the PPM 104 prior to the current acoustic event.

It is then determined whether the time difference between the current acoustic event and the previous acoustic event is less than a non-compliance threshold (block 1008). The non-compliance threshold may be a predetermined period of time within which the PPM 104 must detect an acoustic event to indicate that the PPM 104 is being used according to PPM usage requirements or guidelines. If it is determined at block 1008 that the time difference between the current acoustic event and the previous acoustic event is not less than a non-compliance threshold, a non-compliance message is generated and sent to the audience member (block 1010). The non-compliance message may be sent to the audience member via, for example, the visual interface 216 (FIG. 2) of the PPM 104, a telephone call, mail, email, etc. Alternatively, any media monitoring data collected during the non-compliant period may be flagged as suspect (i.e., unlikely to be associated with media that was actually consumed by the audience member).

The timestamp for the current acoustic event is then stored as the timestamp for the previous acoustic event (block 1014). If the time difference between the current acoustic event and the previous acoustic event is less than a non-compliance threshold or after the operation of block 1012, it is determined if non-compliance analysis should continue (block 1014). If the non-compliance analysis should continue, control is passed back to block 1002. Otherwise, the example method is ended.

Figure 11:
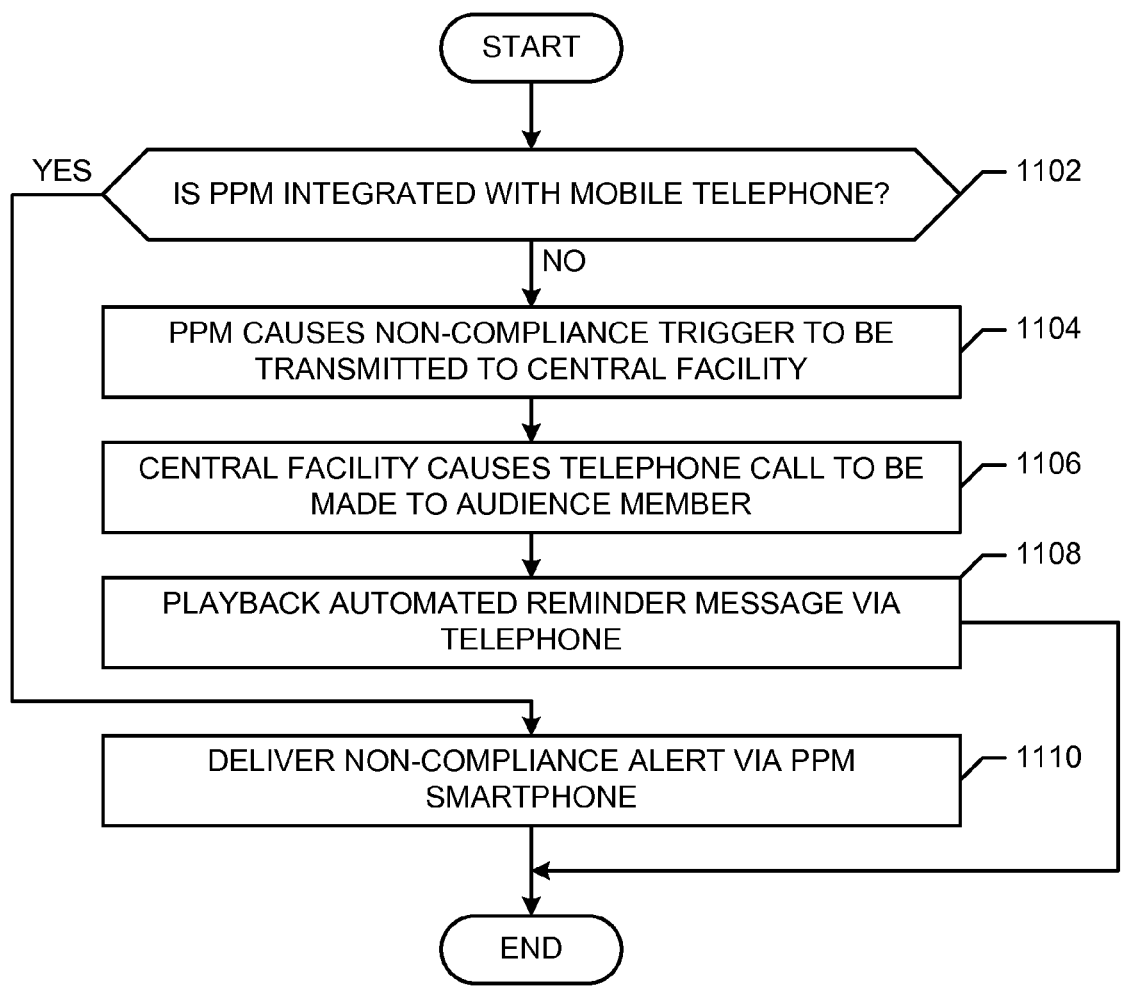
FIG. 11 is a flow diagram of an example method that may be used to inform an audience member via a telephone that PPM usage is not compliant with PPM usage requirements.

FIG. 11 is a flow diagram of an example method that may be used to inform an audience member (e.g., the audience member 106 of FIG. 1) via a telephone (e.g., a home telephone, an office telephone, a mobile telephone) that PPM usage is not compliant with PPM usage requirements. For example, if non-compliance is detected using, for example, any of the example methods described herein, then the PPM 104 (FIG. 1) may be configured to cause a prompting message to be conveyed to the audience member assigned to carry the PPM 104.

In an example embodiment, the PPM 104 first determines if it is integrated with a mobile telephone (e.g., the PPM smartphone 1400 of FIG. 14) (block 1102). If the PPM 104 is not integrated with a mobile telephone, the PPM 104 causes a non-compliance trigger to be transmitted to a central data collection facility (e.g., the central facility 122 of FIG. 1) (block 1104). The central data collection facility causes a telephone call to be placed to a telephone associated with the audience member assigned to carry the PPM 104 (block 1106). For example, if the PPM is configured to operate jointly as a PPM and as a mobile telephone, the telephone call transmitting the reminder message may be placed to the joint PPM/telephone. The telephone call, when answered, causes an automated reminder message to be played to the party that answers the telephone call (block 1108). The reminder message, for example, alerts the audience member to the state of non-compliance and/or reminds the audience member of the PPM usage requirements.

If the PPM 104 determines at block 1102 that it is integrated with a mobile telephone, the integrated or jointly configured PPM and mobile telephone (e.g., the PPM smartphone 1400 of FIG. 14), upon detection of non-compliance causes the telephone to deliver or emit an audio, vibrational and/or visual signal to alert the audience member of the non-compliance (block 1110). For example, the audio signal may be configured as a ringing tone, the vibrational signal may be emitted by a vibrator mechanism associated with the PPM smartphone 1400, and the visual signal may be delivered by causing a display associated with the PPM smartphone 1400 to become active (e.g., illuminated) or to blink between an active and inactive state. In an alternative or additional example, the PPM smartphone 1400, upon detecting non-compliance, causes the telephone circuitry to mimic an incoming phone call by causing the telephone to ring and, when answered, to play a pre-recorded compliance reminder. After the operation of block 1108 or block 1110, the process is ended.

Figure 12:
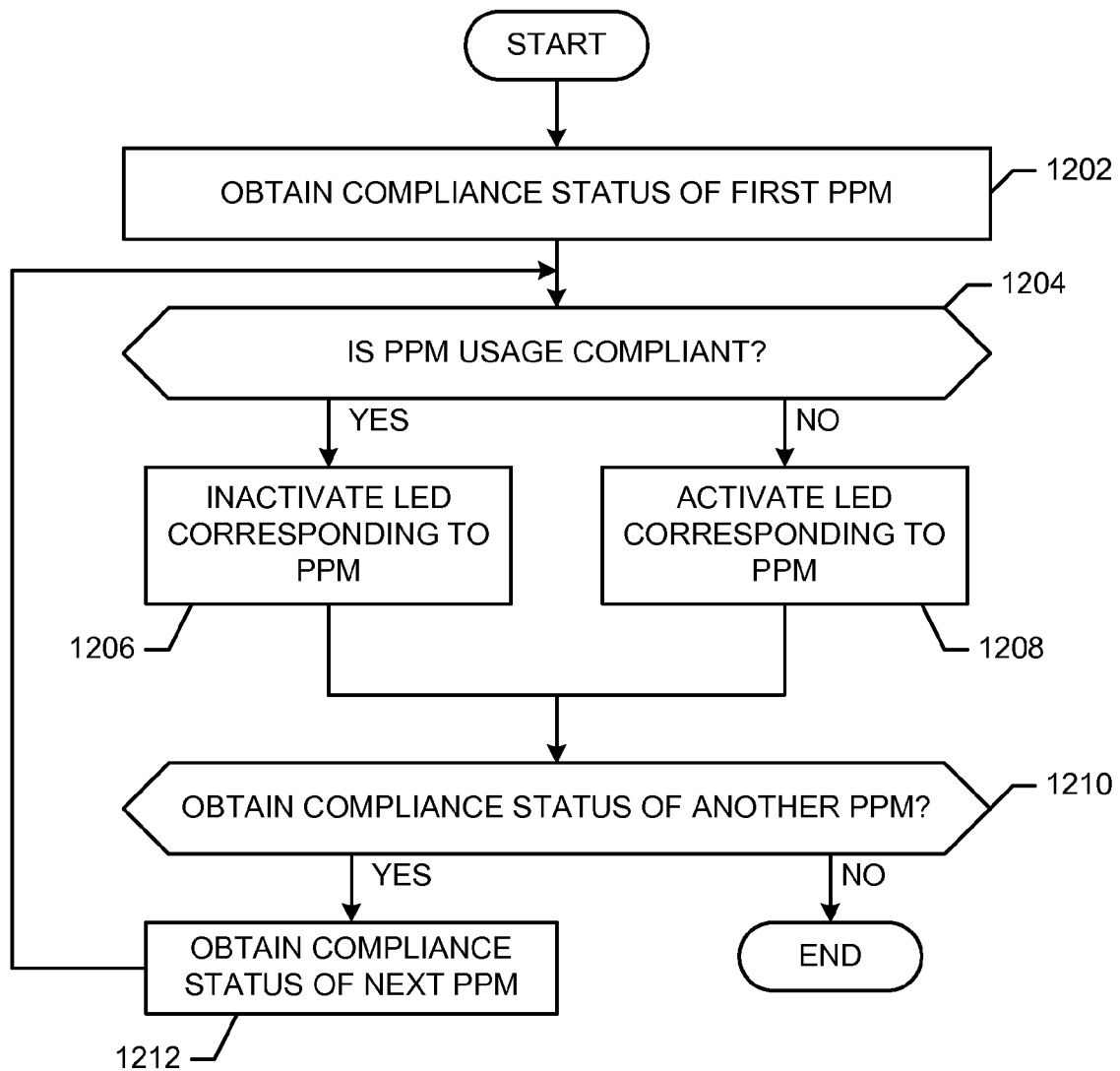
FIG. 12 is a flow diagram of an example method that may be used to control a compliance status device based on the compliance status of each audience member in a household.

FIG. 12 is a flow diagram of an example method that may be used to control a compliance status device (e.g., the compliance status device 119 of FIGS. 1 and 14) based on the compliance status of each audience member in a household (e.g., the household 102 of FIG. 1). In particular, the example method of FIG. 12 may be used to detect (using any method including any of those described herein) compliance of all members of a household and to display the compliance status (i.e., compliant or non-compliant) of each member on the display of the compliance status device 119. The compliance status may be determined by, for example, comparing a plurality of sequentially collected location information to one another as described above in connection with the example method of FIG. 9. The example method may be executed by, for example, the home processing system 121 (FIG. 1) and/or the compliance status device 119.

Turning in detail to the example method of FIG. 12, initially, the compliance status of a first PPM (e.g., the PPM 104 of FIGS. 1 and 2) is obtained (block 1202) and it is determined if the PPM usage is compliant to PPM usage requirements (block 1204). The compliance status may be obtained by causing the first PPM 104 to transmit its compliance status to a central home computer (e.g., the home processing system 121 of FIG. 1) and/or the compliance status device 119. Alternatively, the home processing system 121 and/or the compliance status device 119 may be configured to poll the PPM 104 or to transmit a confirmation request message to the PPM 104. If the PPM 104 does not respond, the home processing system 121 or the compliance status device 119 may determine that the PPM usage is not compliant with PPM usage requirements. Alternatively, the home processing system 121 or the compliance status device 119 may determine if the PPM 104 is in a power-saving mode, which may indicate that the PPM 104 is not compliant as described above in connection with the example methods of FIGS. 9A and 9B.

If the home processing system 121 or the compliant status device 119 determines at block 1204 that the PPM usage is compliant, the LED on the compliant status device 119 that corresponds to the PPM 104 may be inactivated or turned off (block 1206) to indicate that the PPM usage is compliant to PPM usage requirements. However, if it is determined that the PPM usage is not compliant, the LED on the compliant status device 119 that corresponds to the PPM 104 may be activated or turned on (block 1208) to indicate that the PPM usage is not compliant to PPM usage requirements. Although blocks 1206 and 1208 are described as inactivating or activating LEDs based on compliance status, the LEDs may also be configured to glow different colors based on compliance status. For example, the LEDs may be configured to glow red for non-compliant PPM usage and configured to glow green for compliant PPM usage.

The home processing system 121 or the compliant status device 119 then determines if the compliance status of another PPM should be obtained (block 1210). If the compliance status of another PPM should be obtained, the compliance status of a next PPM is obtained (block 1212) and control is passed back to block 1204. Otherwise, the process is ended.

Figure 13:
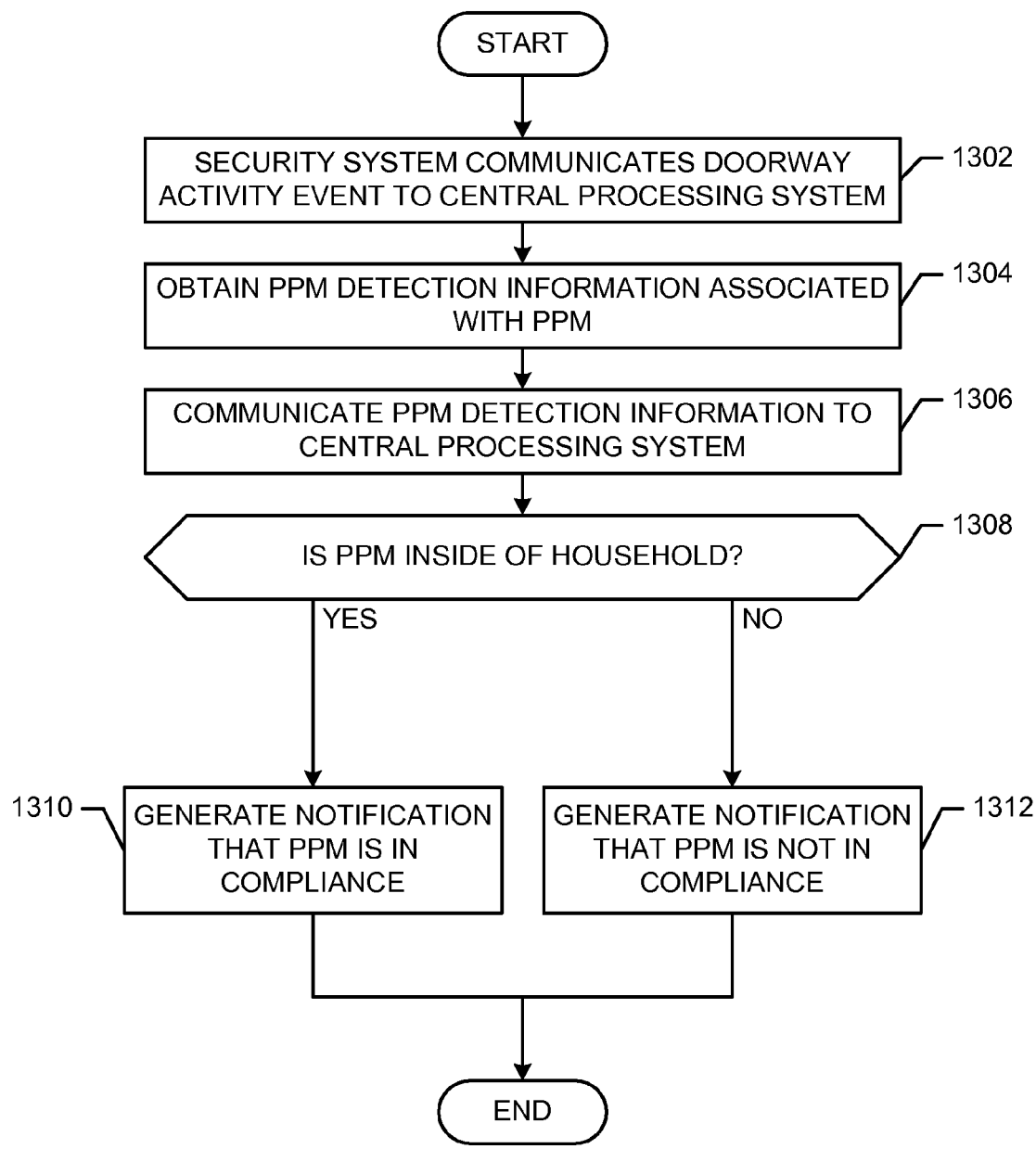
FIG. 13 is a flow diagram of an example method that may be used to determine if PPM usage is compliant with PPM usage requirements.

FIG. 13 is a flow diagram of an example method that may be used to determine if PPM usage is compliant with PPM usage requirements. In particular, the example method of FIG. 13 implemented in combination with the security system 120 (FIG. 1) to detect doorway activity and determine if the household member 106 (FIG. 1) and the PPM 104 (FIG. 1) have left or entered the household 102 (FIG. 1) based on the doorway activity. As described in greater detail below, when doorway activity associated with an exterior door (e.g., a door leading from the inside of a household to the outside of the household) of the household 102 is generated, the doorway activity may be used to determine if the PPM 104 is in compliance by subsequently detecting if the PPM 104 is inside the household 102. In the example method described below, PPM usage requirements require that the PPM 104 be used inside the household 102.

Initially, the security system 120 may communicate a doorway activity event to a central processing system (e.g., the home processing system 121 of FIG. 1) (block 1302). The doorway activity event indicates that an exterior door of the household 102 has been opened or closed and/or that the audience member 106 has walked through the exterior door. A PPM detection device may obtain PPM detection information associated with the location of the PPM 104 (block 1304). The PPM detection device may be used to determine if the audience member 106 has walked out of the household 102 or into the household 102 by detecting a presence, proximity, or location of the PPM 104 as the audience member 106 walks past the PPM detection device after a doorway activity event is generated. The PPM detection information may be proximity information that is used to determine the distance of the PPM 104 from the PPM detection device. Alternatively, the PPM detection information may indicate only whether the PPM 104 is present within the vicinity of the PPM detection device. The PPM detection device may be implemented using, for example, one of the base units 114 (FIG. 1) or the compliance status device 119 (FIGS. 1 and 15) and may be configured to communicate wirelessly with the PPM 104. A wireless transceiver within the PPM detection device may be configured to operate at a frequency and/or signal strength that covers a small area or communicates over a short range and that is substantially attenuated by walls. In this manner, the PPM detection device will not detect the PPM 104 when it is outside of the household 102 and interpret the PPM detection signal or information as meaning that the PPM 104 is within the household 102. Alternatively or additionally, the PPM detection device may be configured to filter out PPM detection signals that are not above a certain signal strength threshold level. An example implementation may also involve generating a delay between the time that the doorway activity event is generated and the time that PPM detection information is obtained. In this manner, sufficient time is provided for the audience member 106 to exit the household 102 after the door is opened.

The PPM detection device then communicates the proximity information to the central processing system (e.g., the home processing system 121) (block 1306). The central processing system may then determine if the PPM 104 is inside the household 102 (block 1308). For example, if the PPM detection information indicates that the PPM 104 is very far from the PPM detection device or if the PPM detection information indicates that the PPM 104 is not present, the central processing system may determine that the PPM 104 is outside of the household 102. Otherwise, if the PPM detection information indicates that the PPM 104 is in close proximity to the PPM detection device or indicates the presence of the PPM 104, the central processing system may determine that the PPM 104 is inside the household 102.

Figure 15:
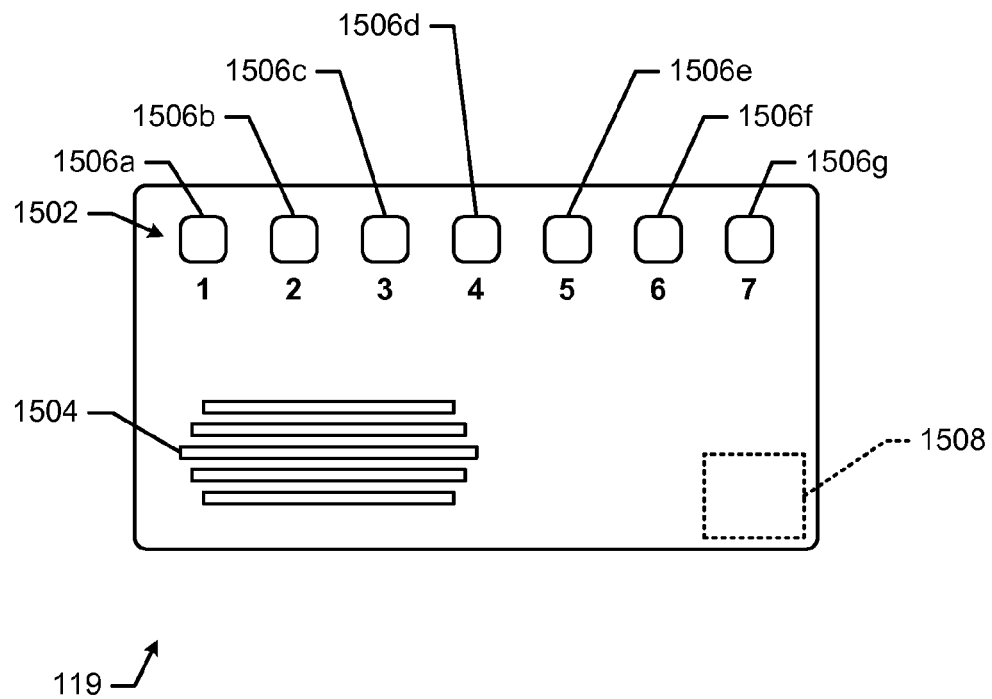
FIG. 15 is a detailed view of the example compliance status device of FIG. 1.

If the PPM 104 is inside the household 102, the central processing system may generate a notification to indicate that the PPM 104 is in compliance (block 1310). If the PPM 104 is outside the household 102, the central processing system may generate a notification to indicate that the PPM 104 is not in compliance (block 1312). The compliance notification generated in block 1310 or the non-compliance notification generated at block 1312 may be communicated to the compliance status device 119 (FIGS. 1 and 15). In this manner, the compliance status device 119 may indicate via a display that the usage of the PPM 104 is not compliant to PPM usage requirements. After the operation of block 1310 or block 1312, the example method of FIG. 13 is ended.

Figure 14:
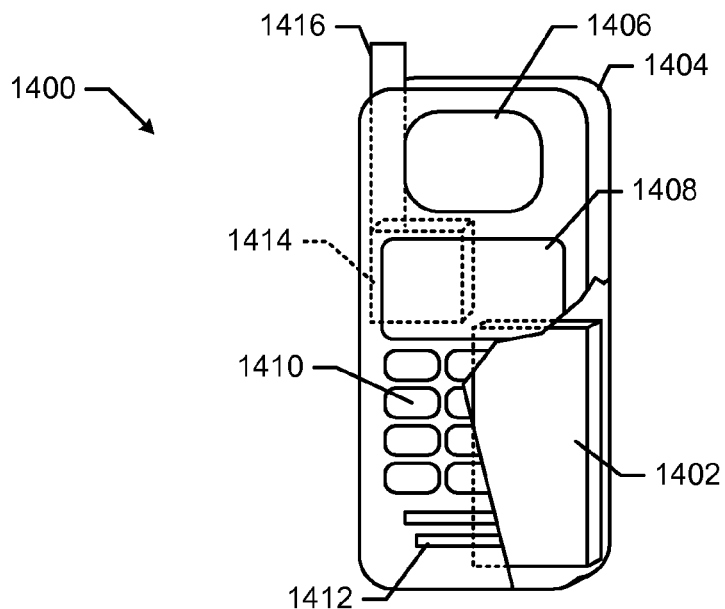
FIG. 14 illustrates an example PPM smartphone.

FIG. 14 illustrates an example PPM smartphone 1400. The example PPM smartphone 1400 is formed using an example PPM 1402 that is embedded in, jointly configured with, or otherwise integrated with a mobile telephone 1404. The example PPM 1402 may be substantially similar or identical to the PPM 104 (FIGS. 1 and 2). The PPM smartphone 1400 may be used in combination with any example methods described herein instead of or in combination with the example PPM 104.

The example mobile phone 1404 may share some functionality with the example PPM 1402. For example, the example mobile telephone 1404 includes a speaker 1406, a display 1408, a plurality of keys (e.g., buttons) 1410, and a microphone 1412, all of which may be communicatively coupled to the example mobile telephone 1404 and the example PPM 1402. In this manner, an audience member (e.g., the audience member 106 of FIG. 2) may interact with the example mobile telephone 1404 and the example PPM 1402 using the same user interface means (e.g., the speaker 1406, the display 1408, the plurality of keys 1410, and the microphone 1412) or user interface means that are common to the example mobile telephone 1404 and the example PPM 1402.

The example PPM 1402 and the example mobile telephone 1404 may also share other features such as electronic circuitry. For example, although the PPM 1402 may include electronic hardware that is substantially similar or identical to the electronic hardware described above in connection with FIG. 2, the PPM 1402 may also be communicatively coupled to electronic hardware of the mobile telephone 1404. For example, as shown in FIG. 14, the mobile telephone 1404 includes a mobile telephone transceiver 1414 that is communicatively coupled to an antenna 1416. The mobile telephone transceiver 1414 may be implemented using, for example, CDMA technology, TDMA technology, GSM technology, analog/AMPS technology, and/or any other suitable mobile communication technology. The PPM 1402 may be communicatively coupled to the mobile telephone transceiver 1414 and may use the mobile telephone transceiver to, for example, communicate with a central data collection facility (e.g., the central facility 122 of FIG. 1). The mobile telephone 1404 may also include other electronics hardware such as, for example, a Bluetooth® transceiver and/or an 802.11 (i.e., Wi-Fi®) transceiver, both of which may be communicatively coupled to the mobile telephone 1404 and the PPM 1402.

FIG. 15 is a detailed view of the example compliance status device 119 of FIG. 1. The compliance status device 119 includes a display 1502 and a speaker 1504. The display 1502 may be implemented using a set of LEDs 1506a-1506g. Each of the LEDs 1506a-1506g may represent one of the household audience members. The LEDs 1506a-1506g may be used to indicate whether the household audience members' PPM usage is in compliance with PPM usage requirements. For example, each of the LEDs 1506a-1506g may be a multi-color LED and may glow red when the corresponding household audience member is non-compliant and may glow green when the corresponding household audience member is compliant. Alternatively, each of the LEDs 1506a-1506g may be active (e.g., turned on) when the corresponding household audience member is non-compliant and inactive (e.g., turned off) when the corresponding household audience member is compliant. In an alternative example implementation, the display 1502 may be implemented using an LCD or any other suitable display technology in combination with or instead of the LEDs 1506a-1506g. The speaker 1504 may be used to generate alerts or alarms. The alerts may be used to indicate, for example, when a household audience member is in a compliant or a non-compliant state. For example, the speaker 1504 may be used to emit a unique tone for each audience member of the household that is non-compliant.

The compliance status device 119 may also include a wireless transceiver 1508. The wireless transceiver 1508 may be implemented using, for example, a Bluetooth® transceiver, an 802.11 transceiver, and/or any other suitable wireless transceiver. The compliance status device 119 may be communicatively coupled to each PPM of the household 102, each base unit 114 (FIG. 1), the security system 120 (FIG. 1), and the home processing unit 121 (FIG. 1) via the wireless transceiver 1508. Each PPM in the household 102 may be configured to wirelessly transmit compliance status information directly to the compliance status device 119 and/or, each PPM may be configured to transmit compliance status information to a central collection facility (e.g., the central facility 122 of FIG. 1). The central collection facility may then communicate the compliance status information to the compliance status device 119 via, for example, the home processing system 121.

In some example implementations, the compliance status device 119 and/or the operations, processes, or function of the compliance status device 119 may be implemented using the home processing system 121 (FIG. 1) or any other processing system or apparatus. In this case, the home processing system 121 or other processing system or apparatus used to implement the compliance status device 119 may be configured to display compliance status information of household members via, for example, a graphical user interface and communicate the compliance status information to the central facility 122.

Figure 16:
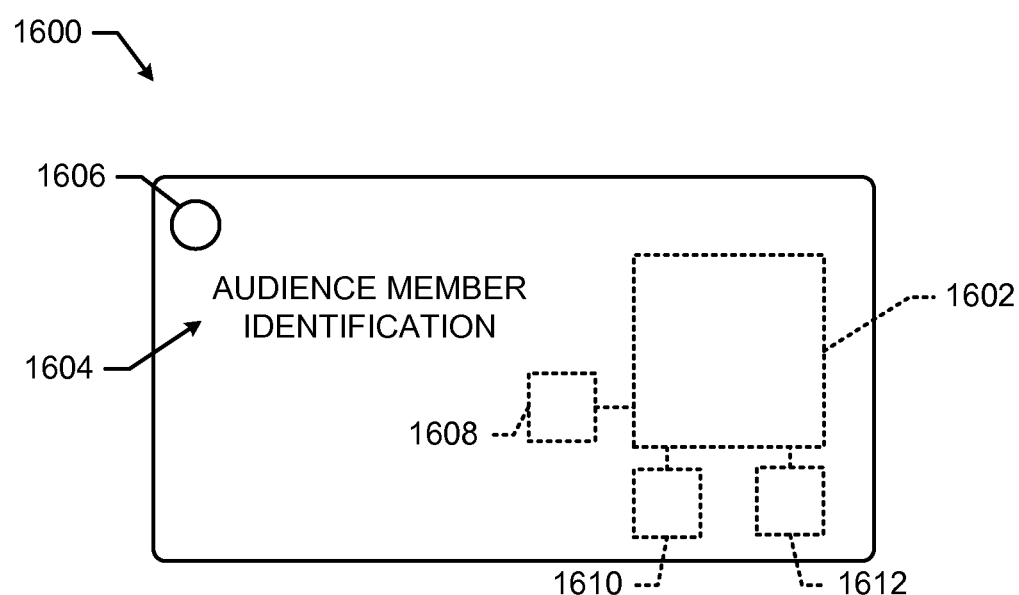
FIG. 16 illustrates an example identification tag.

FIG. 16 illustrates an example identification tag 1600. The example identification tag 1600 (e.g., a portable device) may be carried or worn by an audience member (e.g., the audience member 106 of FIG. 1) and used to detect the proximity of the audience member 106 to a location information system (e.g., one or more of the base units 114 of FIGS. 1 and 3) or a media presentation device (e.g., one or more of the plurality of media delivery centers 112 of FIG. 1). The identification tag 1600 may also be configured to detect the location of the audience member 106 relative to a location information system, a media presentation device, or any other suitable point of reference (e.g., a location grid). Additionally or alternatively, the identification tag 1600 may also be used to detect the presence of the audience member 106 within a room and/or a household (e.g., the household 102 of FIG. 1).

In the illustrated example, the identification tag 1600 is implemented in the shape of a credit card or key chain and includes an electronic system-on-chip (SOC) 1602 and audience member identification indicia 1604. The electronic SOC 1602 may include a memory and RF circuitry and in some implementations may include a processor. The memory may be used to store audience member identification information and the RF circuitry may be used to transmit the audience member identification information from the memory to the base units 114. The electronic SOC 1602 may be configured to be powered via RF emissions transmitted by, for example, the base units 114.

The identification information 1604 may be printed, engraved, or otherwise put on a surface of the identification tag 1600. The identification information 1604 may be the name of an audience member or an identification number corresponding to the audience member. The identification information 1604 may be the same information that is stored in the memory of the electronic SOC 1602.

Each audience member of a household (e.g., the household 102 of FIG. 1) may be instructed to wear or carry an identification tag that is substantially similar or identical to the identification tag 1600. In some implementations, an audience member may be instructed to clip an identification tag to each of their most frequently carried or worn belongings. For example, a plurality of identical (e.g., all having the same audience member identification information printed thereon and/or stored in the electronic SOC 1602) identification tags may be issued to each audience member. Each audience member may then clip or store each identification tag in, for example, a purse, a jacket, shoes, a belt, a wallet, a key chain, etc. The identification tag 1600 may include a key chain hole 1606 that may be used to attach the identification tag 1600 to a set of keys. Clipping, attaching, or storing an identification tag in each of an audience member's most frequently used belongings ensures that the audience member will always carry or wear an identification tag.

The identification tag 1600 may also include a pressure sensor 1608, a motion sensor 1610, and a temperature sensor. The sensors 1608, 1610, and 1612 may be communicatively coupled to the electronic SOC 1602 so that the electronic SOC 1602 may store information related to pressure, motion, and/or temperature and/or transmit the information to a processor system (e.g., the base units 114, the home processing system 121, or the PPM 104 of FIG. 1). The sensors 1608, 1610, and 1612 may be used to determine if the identification tag 1600 is being worn or carried and if usage of the identification tag 1600 is compliant to usage requirements that may be substantially similar or identical to PPM usage requirements. For instance, information generated by the pressure sensor 1608 may be indicative of whether a person is grasping the identification tag 1600 or whether the identification tag 1600 is disposed in a person's pocket or wallet. Information generated by the motion sensor 1610 may be indicative of whether the identification tag 1600 is moving, thus, leading to the inference that a person is carrying or wearing the identification tag 1600. Information generated by the temperature sensor 1612 may be indicative of a person's body temperature, thus, leading to the inference that a person is carrying or wearing the identification tag 1600.

The information generated by the sensors 1608, 1610, and 1612 may be used to perform behavior analysis to determine if an audience member was carrying or wearing the identification tag 1600 in compliance with, for example, carrying/wearing requirements or guidelines. In addition, the motion sensor 1610 may be used to generate motion information that is later used to perform behavior analyses to determine if an audience member is properly or adequately exposed to or consuming a media presentation.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A method of determining compliance with usage guidelines of an audience measurement system, comprising:
   obtaining first location information associated with an audience member;
   determining, via a processor, whether the audience member is in compliance with the usage guidelines based on a time difference between a first timestamp corresponding to the first location information and a second timestamp corresponding to a time at which a change in location of the audience member was previously detected; and
   tagging media monitoring information corresponding to the first location information as non-compliant in response to determining that the time difference between the first and second timestamps is not less than a threshold.

2. A method as defined in claim 1, wherein determining whether the audience member is in compliance with the usage guidelines comprises:
   obtaining second location information associated with the audience member; and
   determining whether the audience member is in compliance with the usage guidelines based on whether the first location information is different from the second location information.

3. A method as defined in claim 1, wherein determining whether the audience member is in compliance with the usage guidelines further comprises:
   obtaining a third timestamp associated with second location information; and
   determining whether the audience member is in compliance with the usage guidelines based on a second time difference between the first timestamp and the third timestamp.

4. A method as defined in claim 3, wherein the audience member is not in compliance with the usage guidelines if the second time difference is not less than a second threshold and a difference between the first and second location information is not greater than a third threshold.

5. A method as defined in claim 1, further comprising generating a non-compliance message to be sent to the audience member if the audience member is not in compliance with the usage guidelines.

6. A method as defined in claim 1, wherein the location information includes location coordinates.

7. A method as defined in claim 1, wherein the media monitoring information is information indicative of at least one of a video presentation or an audio presentation.

8. A method as defined in claim 1, wherein determining whether the audience member is in compliance with the usage guidelines comprises determining whether the audience member is at least one of carrying or wearing a portable meter of the audience measurement system in compliance with the usage guidelines.

9. A method of determining compliance with usage guidelines of an audience measurement system, comprising:
   determining, via a processor, whether the audience member is in compliance with the usage guidelines based on a time difference between a first timestamp associated with a first acoustic event and a second timestamp associated with a second acoustic event;
   tagging media monitoring information as non-compliant in response to determining that the audience member is not in compliance with the usage guidelines; and
   generating a non-compliance message to be communicated to the audience member in response to determining that the audience member is not in compliance with the usage guidelines.

10. A method as defined in claim 9, wherein determining whether the audience member is in compliance with the usage guidelines comprises:
    comparing the time difference to a non-compliance time threshold.

11. A method as defined in claim 10, further comprising determining that the audience member is not in compliance with the usage guidelines if the time difference is not less than the non-compliance time threshold.

12. A method as defined in claim 9, wherein the first acoustic event is indicative of an acoustic emission detected via an audio detector.

13. A method as defined in claim 12, wherein the acoustic emission is at least one of a scraping sound, a tapping sound, or a wind sound.

14. A method of determining compliance with usage guidelines of an audience measurement system, comprising:
    obtaining compliance status information generated by a portable meter indicative of whether an audience member associated with the portable meter is in compliance with the usage guidelines, the compliance status information being based on a time difference between a first timestamp corresponding to a first location of the audience member and a second timestamp corresponding to a time at which a change in location of the audience member was previously detected;
    tagging media monitoring information as non-compliant in response to determining that the audience member is not in compliance with the usage guidelines; and
    presenting, via a device, a notification indicative of whether the audience member is in compliance with the usage guidelines based on the compliance status information.

15. A method as defined in claim 14, wherein the audience member is in compliance with the usage guidelines if the portable meter is located within a household.

16. A method as defined in claim 14, further comprising generating a non-compliance message to be communicated to the audience member if the audience member is not in compliance with the usage guidelines.

17. A system to determine compliance with usage guidelines of an audience measurement system, comprising:
    a portable device to be associated with an audience member and to:

generate compliance status information based on location information indicative of one or more locations of the portable device, the compliance status information indicative of whether the audience member is using the portable device in compliance with the usage guidelines based on a time difference between a first timestamp corresponding to a first location of the portable device and a second timestamp corresponding to a time at which a change in location of the portable device was previously detected; and tag media monitoring information as non-compliant in response to determining that the audience member is not in compliance with the usage guidelines; and a compliance status device to be located within an environment associated with activities of the audience member and communicatively coupled to the portable device, wherein the compliance status device is to receive the compliance status information generated by the portable device and generate a notification indicative of a compliance status of the audience member with the usage guidelines.

18. A system as defined in claim 17, wherein the compliance status device includes a light indicator corresponding to the portable device, and wherein generating the notification comprises activating the light indicator based on the compliance of the audience member with the usage guidelines.

19. A system as defined in claim 17, wherein the portable device comprises at least one of a mobile phone, a portable meter, or an identification tag.

20. A system as defined in claim 17, wherein the portable device is further to generate the compliance status information based on at least one of direction information or acoustic information.

21. A system as defined in claim 17, further comprising a plurality of base units disposed within the environment and communicatively coupled to the portable device, wherein each of the base units corresponds to a separate, respective room of the environment, and wherein the portable device is to generate the compliance status information based on information received from the base units.

22. A system as defined in claim 17, further comprising a radio frequency tag, wherein the compliance status device is to determine second compliance status information based on the location of the radio frequency tag within the environment.

23. A system as defined in claim 17, wherein the audience member is not in compliance with the usage guidelines if a difference between first and second locations of the portable device is not greater than a threshold value.

24. A system to determine compliance with usage guidelines of an audience measurement system, comprising:

a portable device associated with an audience member; and a base unit communicatively coupled to the portable device, wherein the base unit is to:

use location information associated with the portable device to generate compliance status information indicative of whether the audience member is using the portable device in compliance with the usage guidelines based on a time difference between a first timestamp corresponding to a first location of the portable device and a second timestamp corresponding to a time at which a change in location of the portable device was previously detected; and tag media monitoring information as non-compliant in response to determining that the audience member is not in compliance with the usage guidelines.

25. A system as defined in claim 24, wherein the portable device is to communicate identification information to the base unit, and wherein the base unit is to generate the location information indicative of a location of the portable device.

26. A method as defined in claim 12, wherein the acoustic emission is at least one of audio associated with a media presentation or speech.

* * * * *

UNITED STATES PATENT AND TRADEMARK OFFICE
CERTIFICATE OF CORRECTION

| | | |
|---|---|---|
| PATENT NO. | : 8,650,586 B2 | Page 1 of 1 |
| APPLICATION NO. | : 11/856602 | |
| DATED | : February 11, 2014 | |
| INVENTOR(S) | : Lee et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 976 days.

Signed and Sealed this
Thirtieth Day of June, 2015

Michelle K. Lee
*Director of the United States Patent and Trademark Office*